B. W. TUCKER.
MACHINE FOR MAKING WINDOW SHADES.
APPLICATION FILED JULY 19, 1911.

1,070,640.

Patented Aug. 19, 1913.
14 SHEETS—SHEET 1.

Witnesses:
E. Williams
Chas. E. Rinda

Inventor
B. W. Tucker
By his Attorneys
Cromwell & Carswell

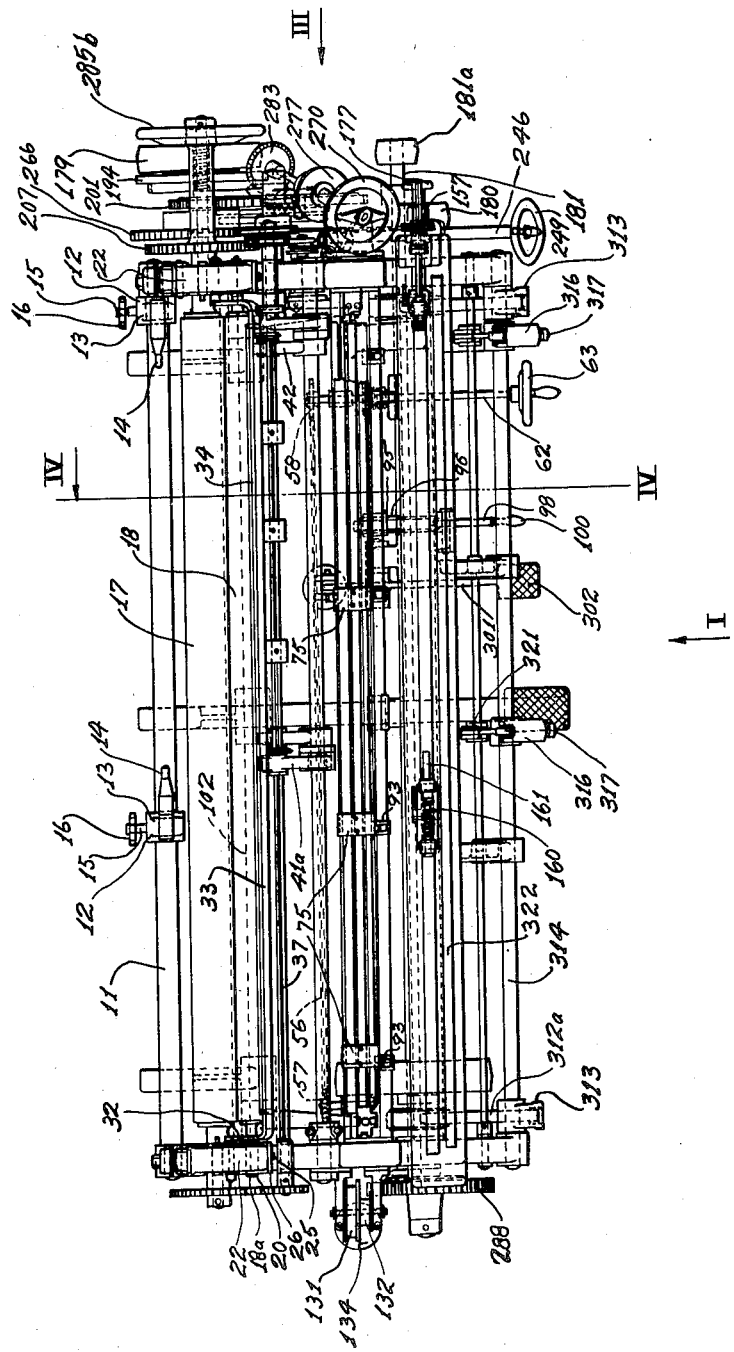

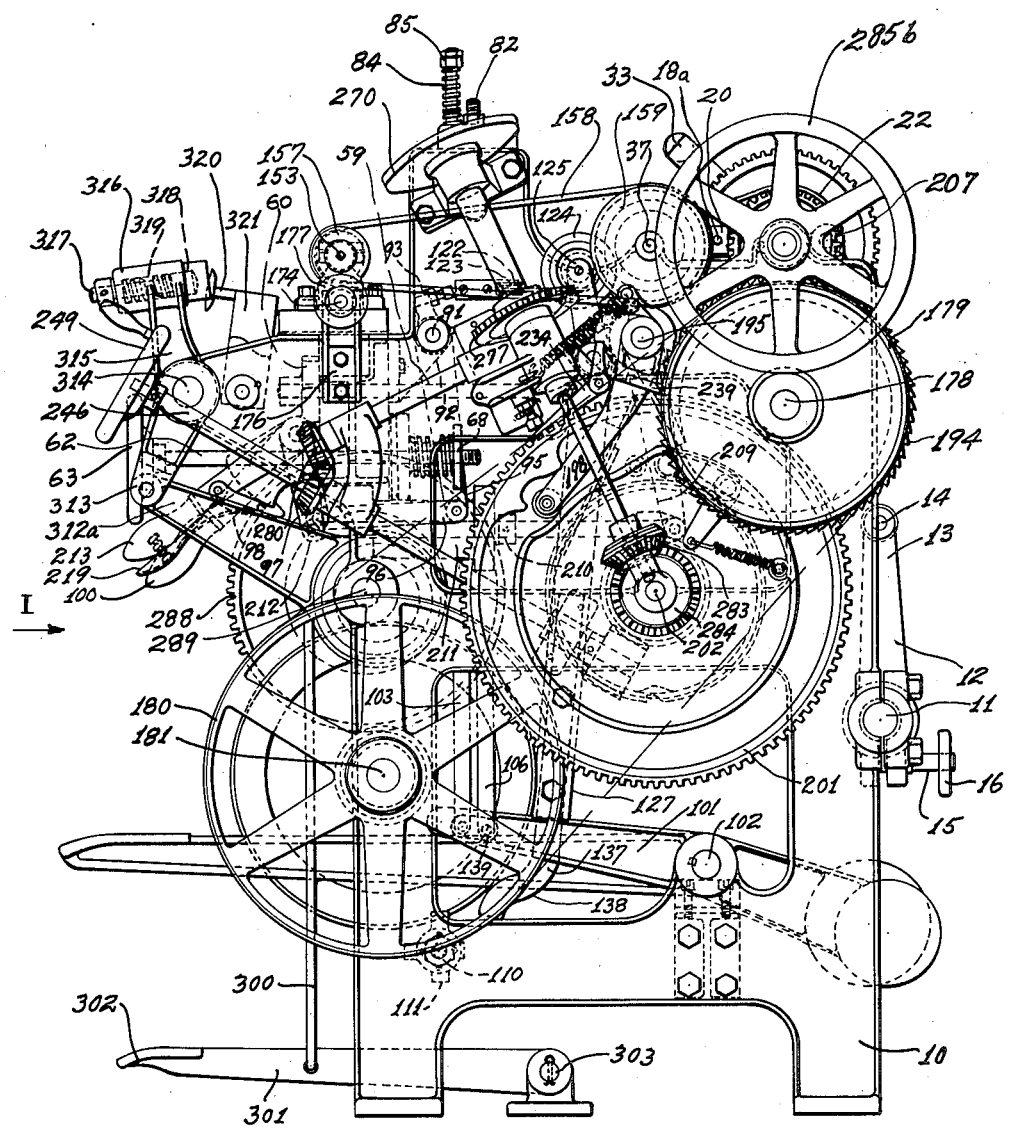

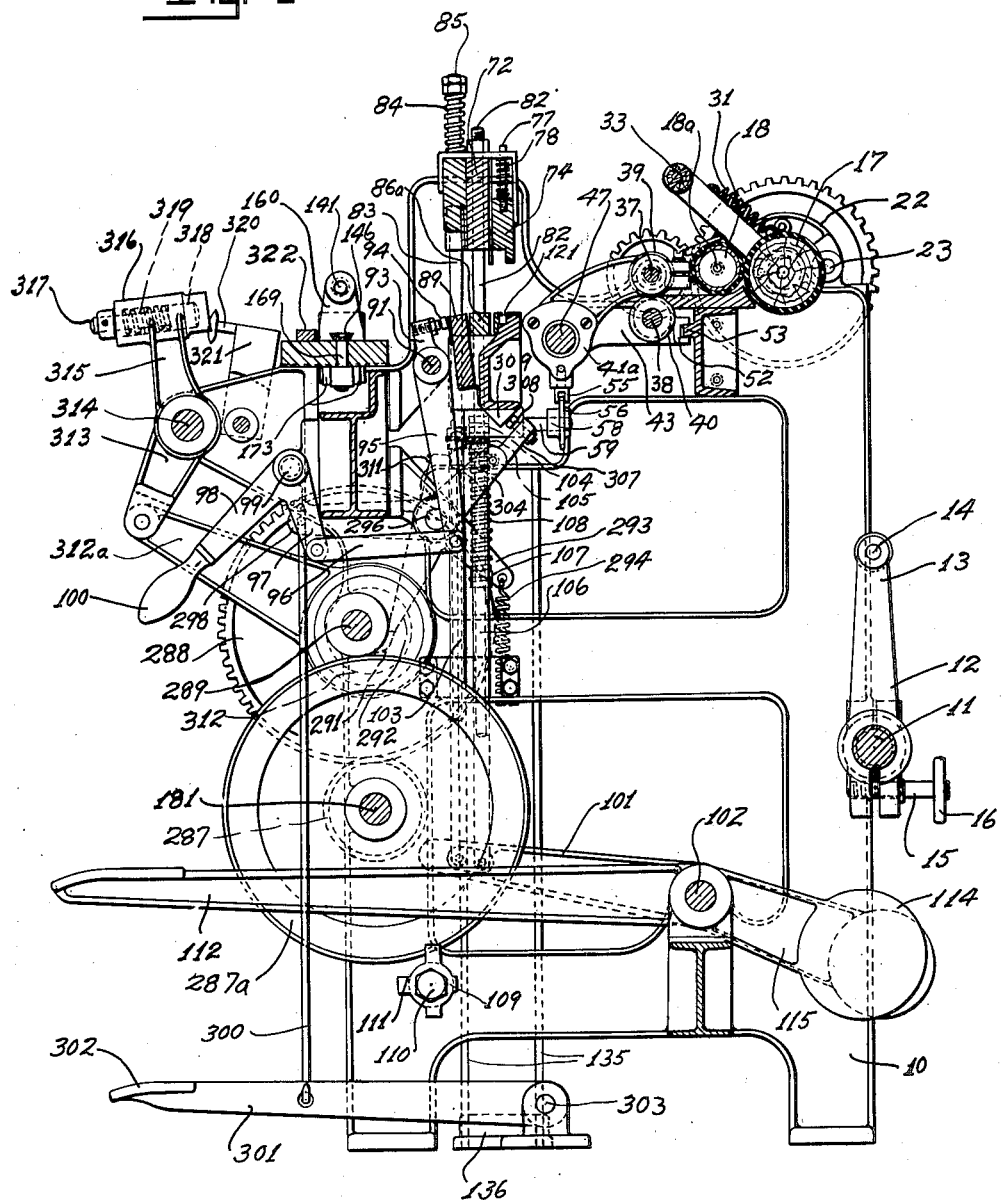

B. W. TUCKER.
MACHINE FOR MAKING WINDOW SHADES.
APPLICATION FILED JULY 19, 1911.
1,070,640.
Patented Aug. 19, 1913.
14 SHEETS—SHEET 5.
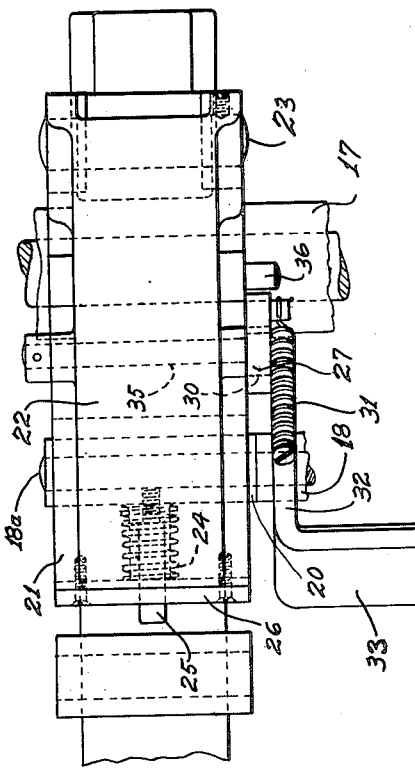
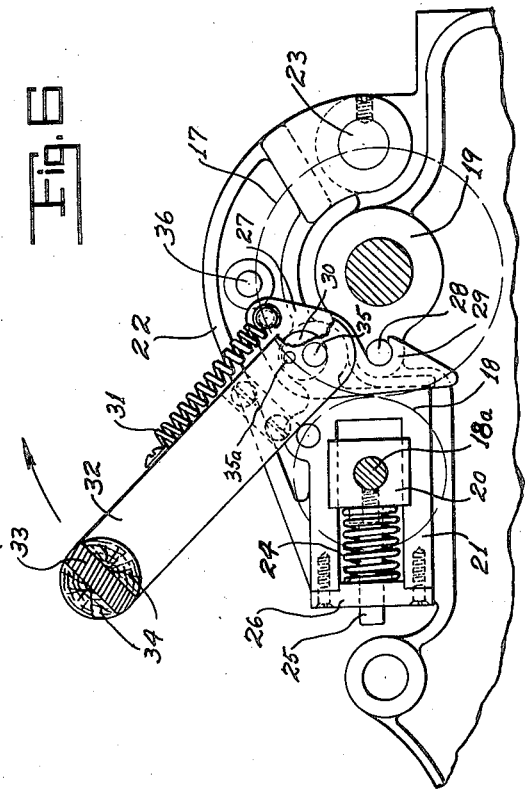
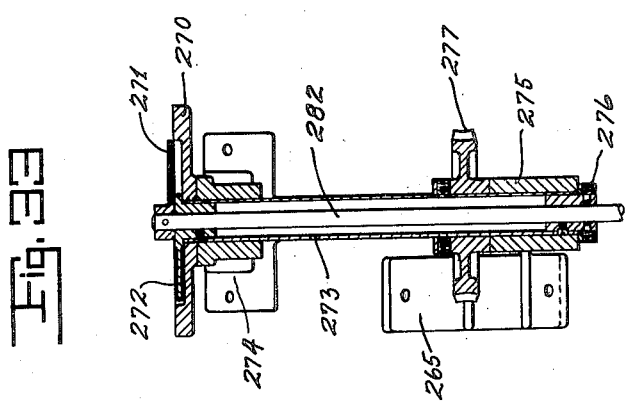
Witnesses:
M. Williams
Chas. E. Rinder
Inventor
B. W. Tucker
By his Attorneys
Criswell & Criswell

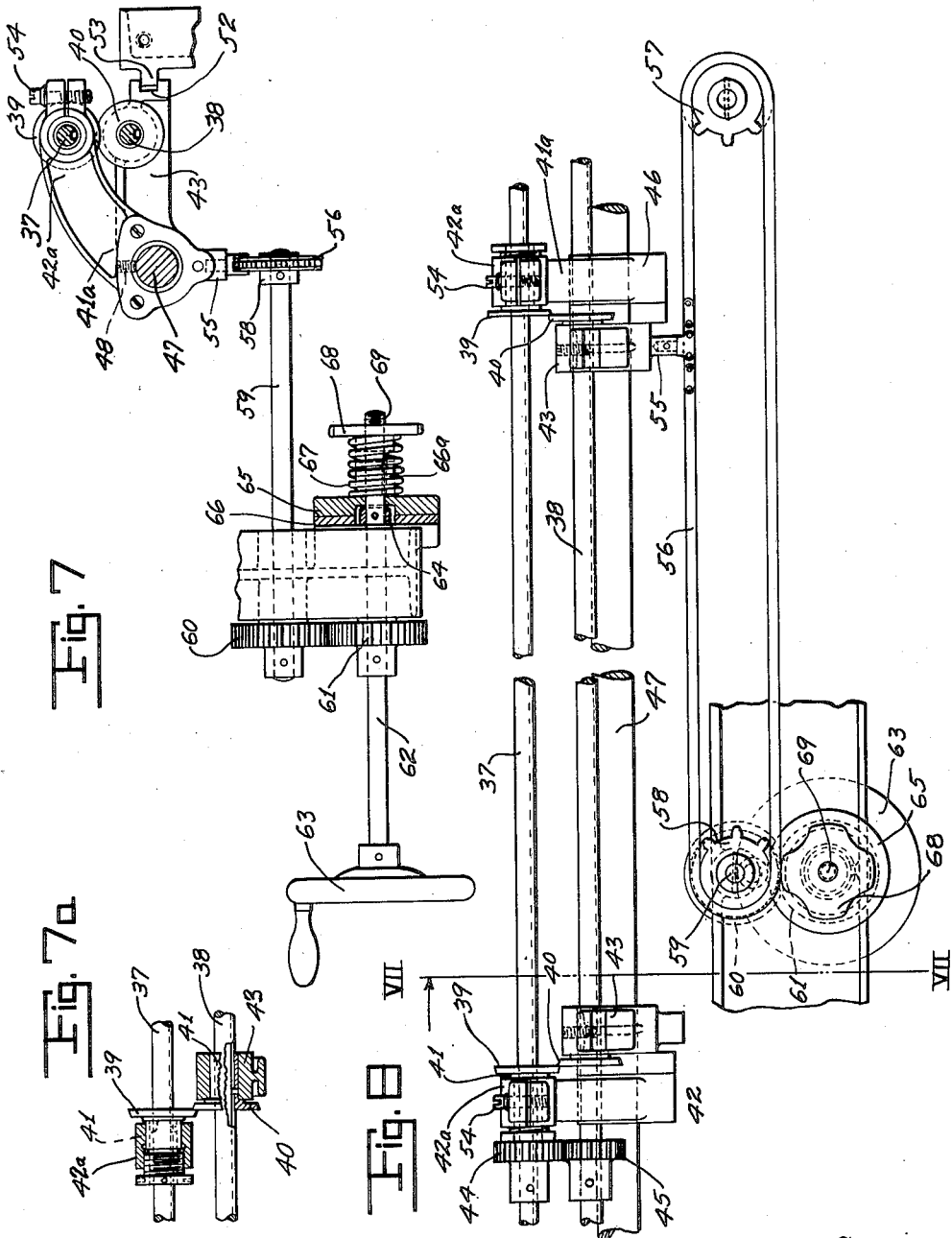

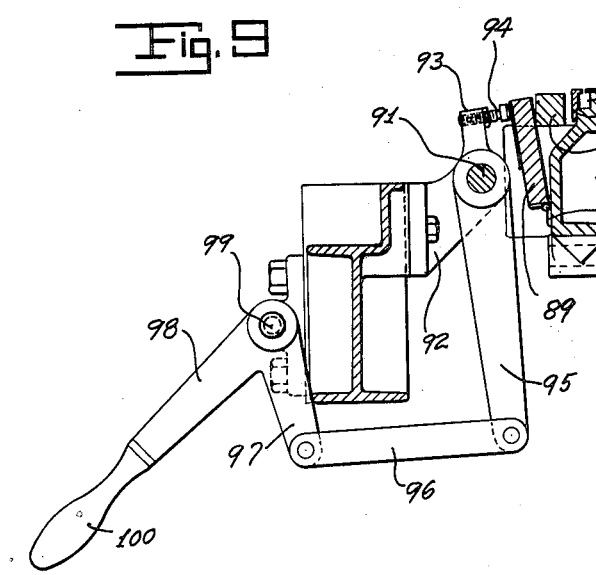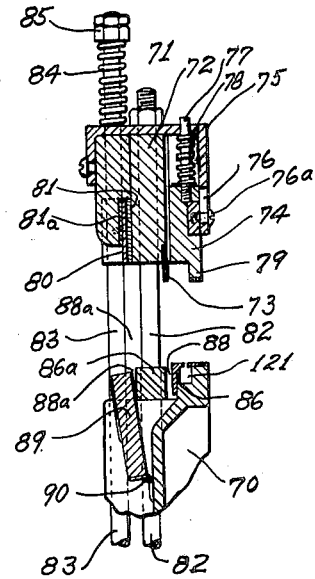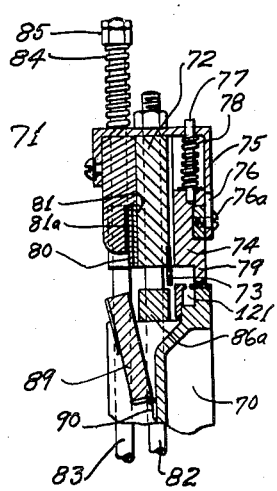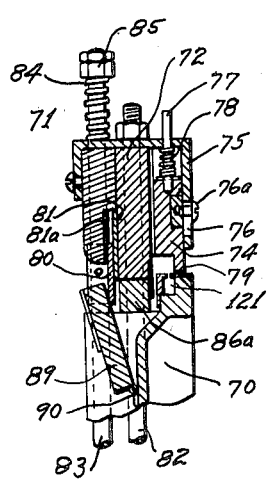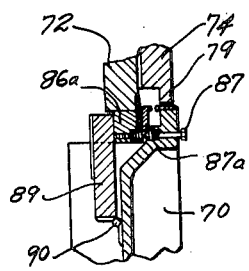

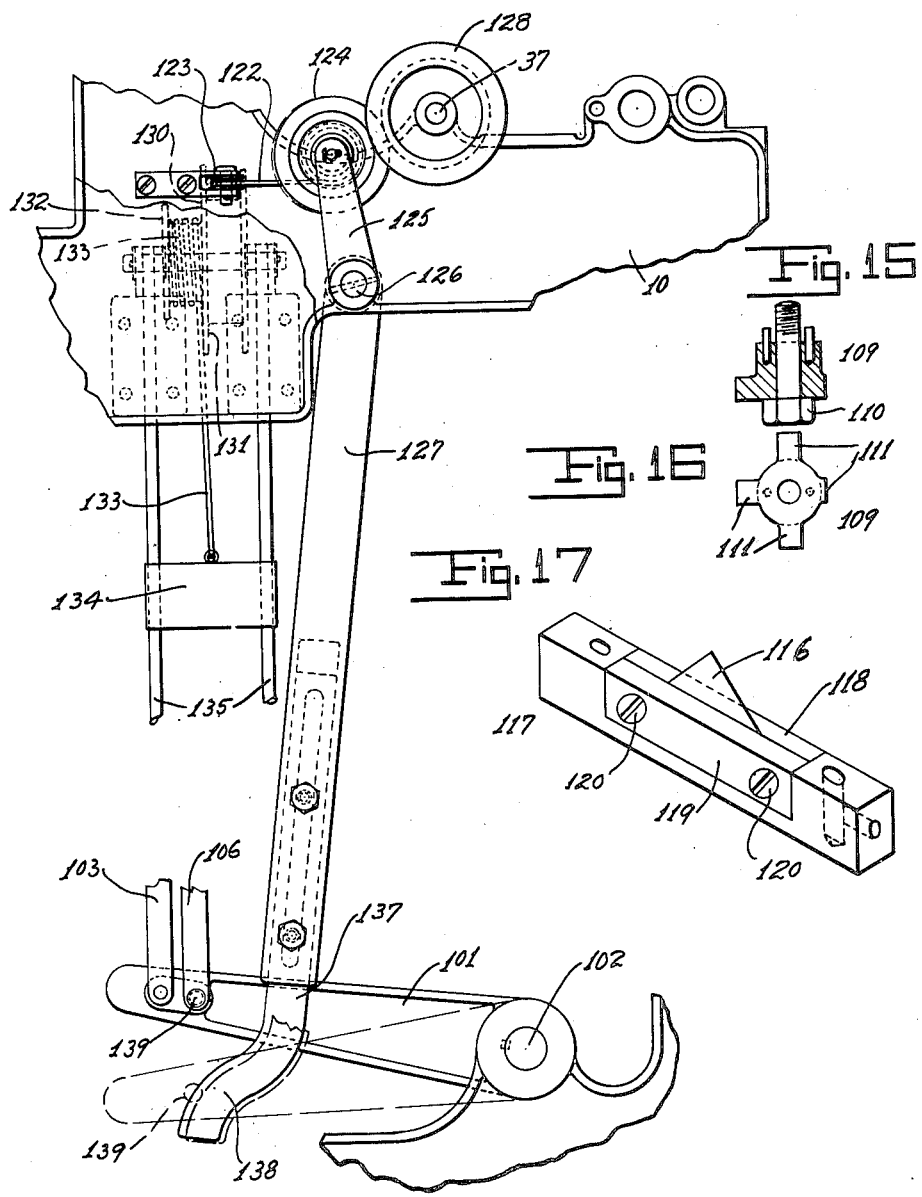

B. W. TUCKER.
MACHINE FOR MAKING WINDOW SHADES.
APPLICATION FILED JULY 19, 1911.
1,070,640.
Patented Aug. 19, 1913.
14 SHEETS—SHEET 9.
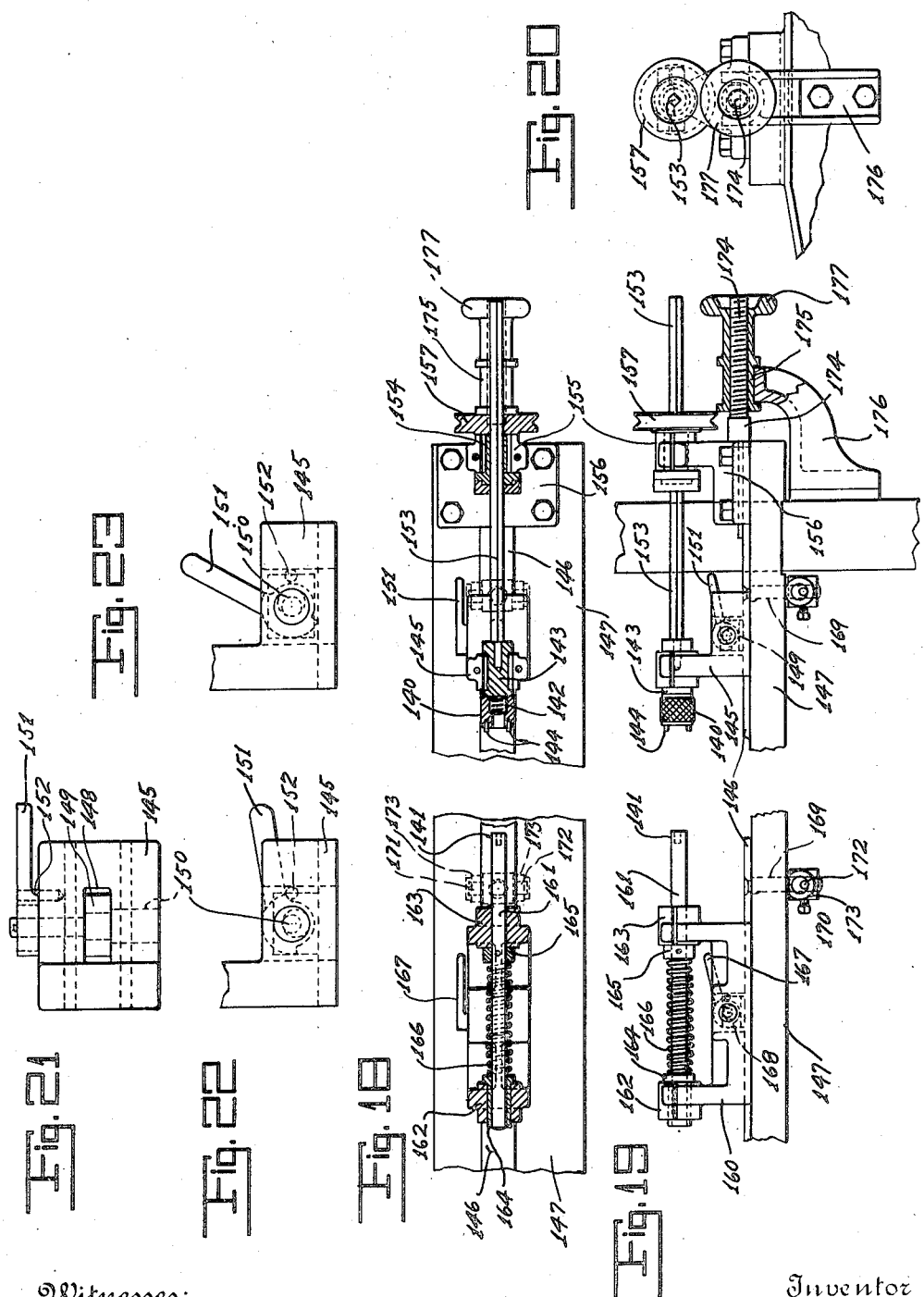
Witnesses:
E. Williams
Chas. E. Riordan
Inventor
B. W. Tucker
By his Attorneys
Criswell & Criswell

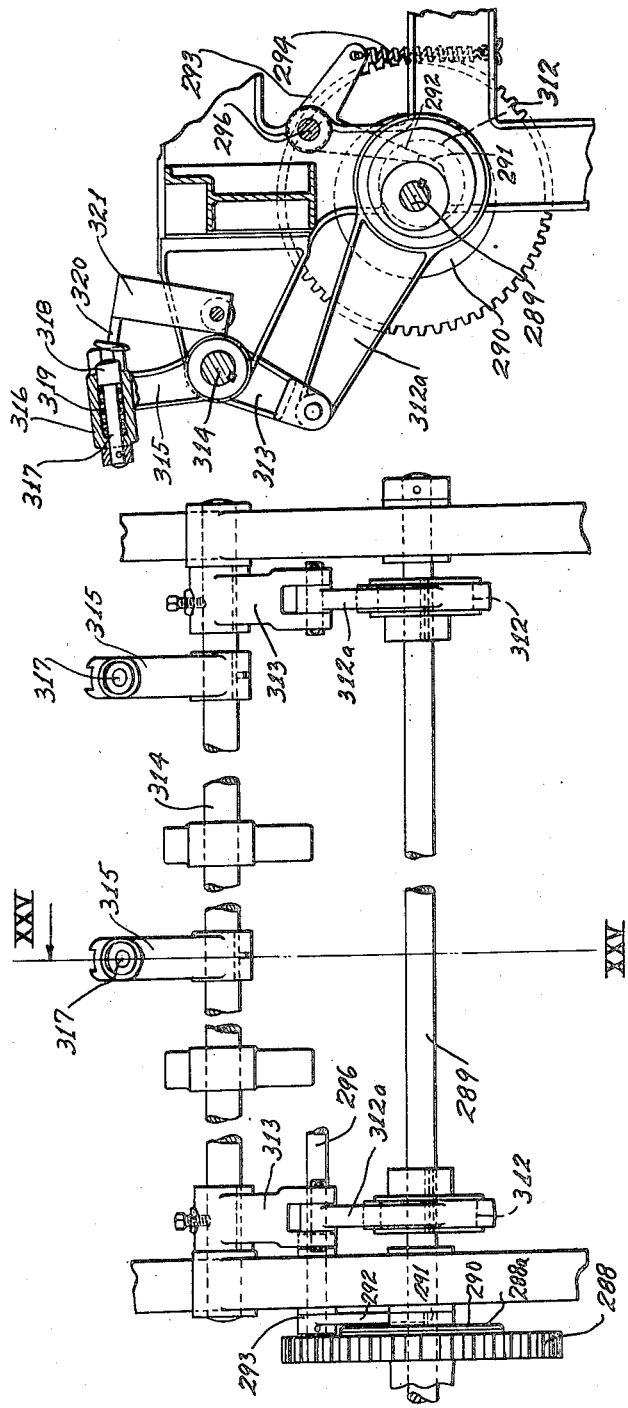

B. W. TUCKER.
MACHINE FOR MAKING WINDOW SHADES.
APPLICATION FILED JULY 19, 1911.
1,070,640.
Patented Aug. 19, 1913.
14 SHEETS—SHEET 11.
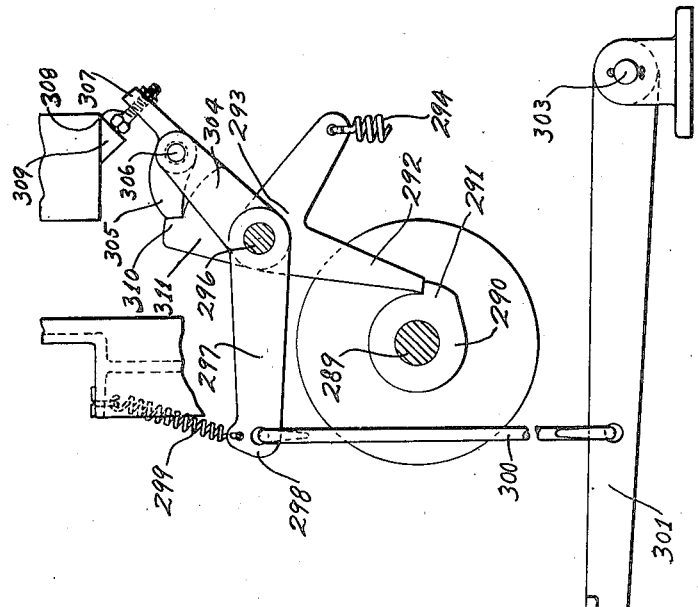
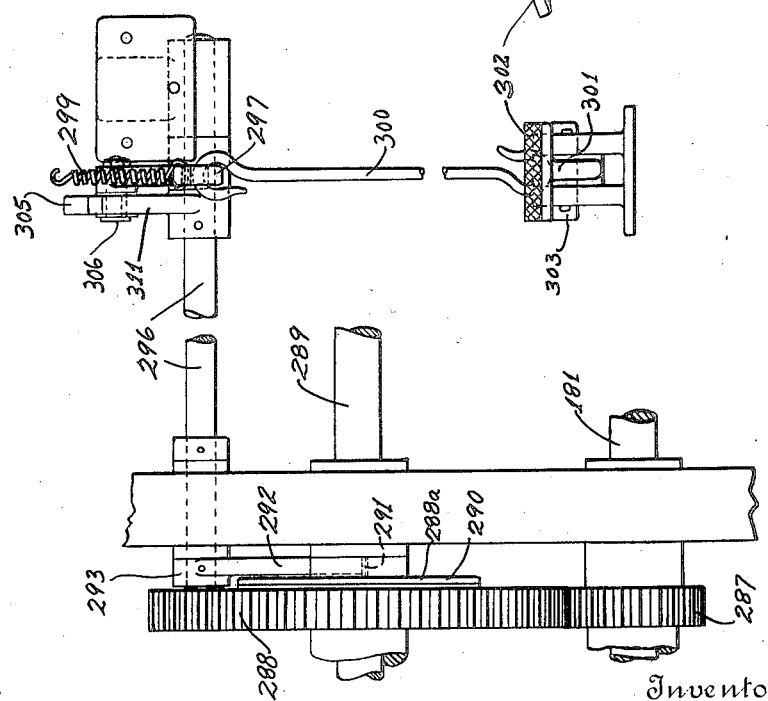
Witnesses:
E. Williams
Chas E Riordan
Inventor
B. W. Tucker
By his Attorneys
Criswell & Criswell

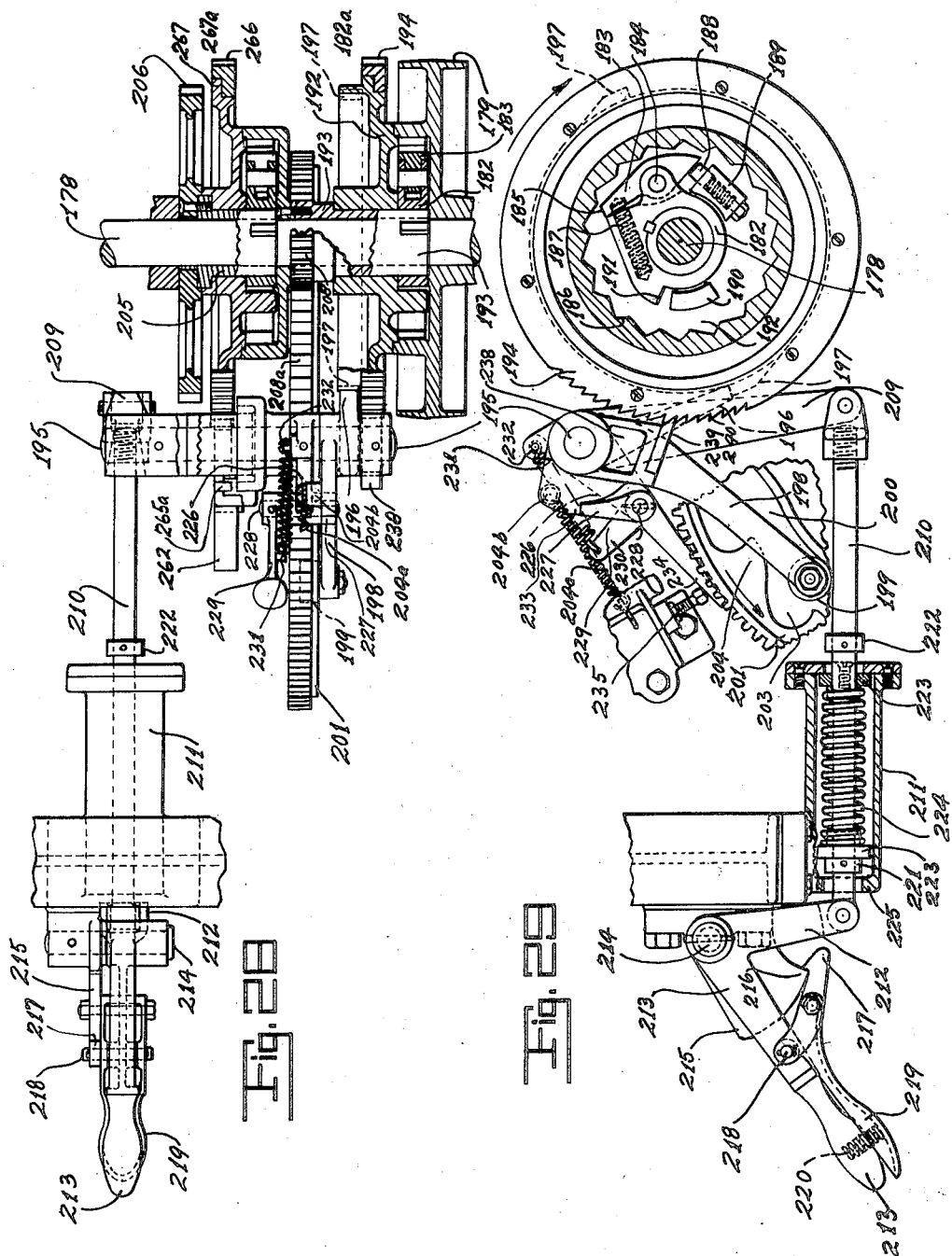

B. W. TUCKER.
MACHINE FOR MAKING WINDOW SHADES.
APPLICATION FILED JULY 19, 1911.
1,070,640.
Patented Aug. 19, 1913.
14 SHEETS—SHEET 13.
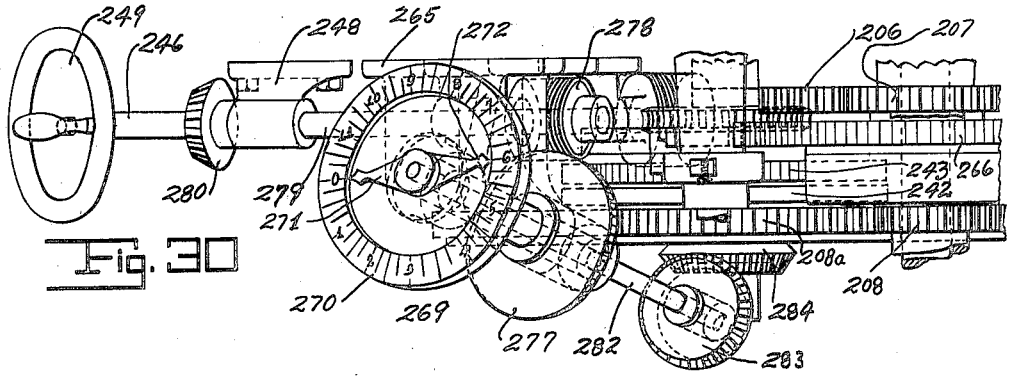
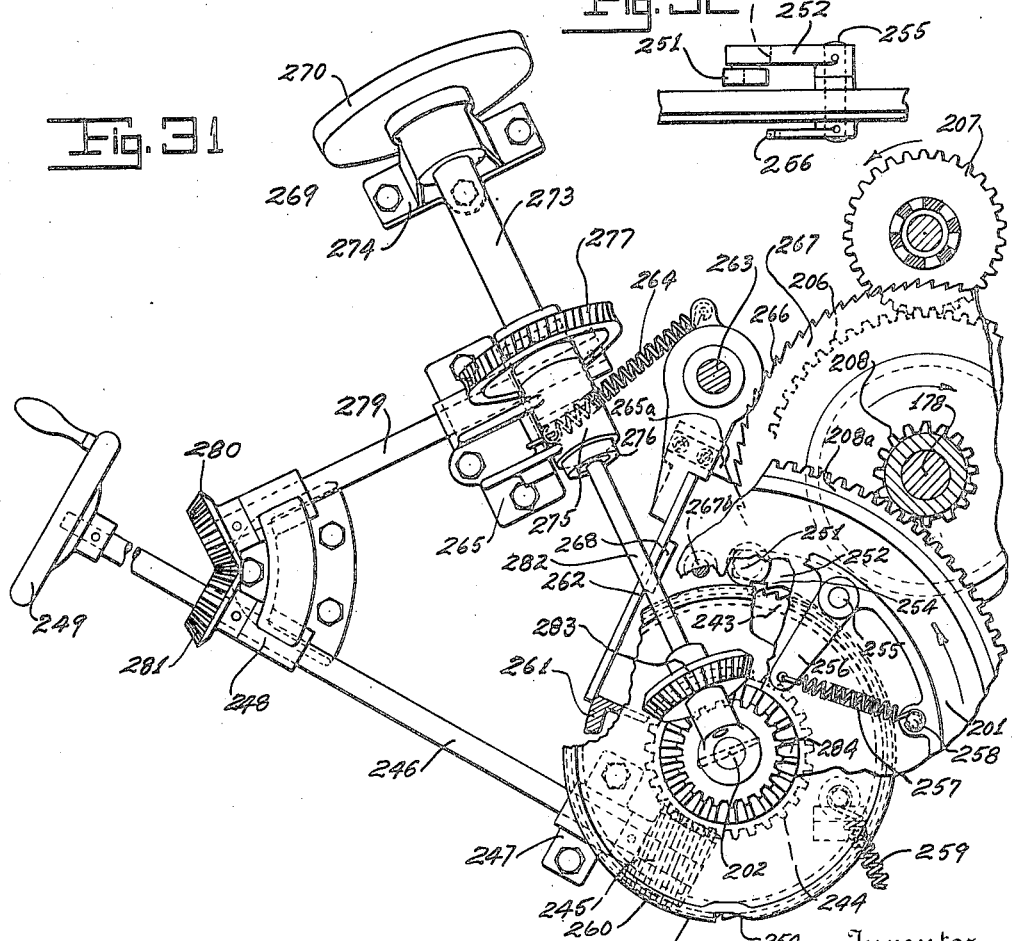
Witnesses:
Inventor
B. W. Tucker
By his Attorneys

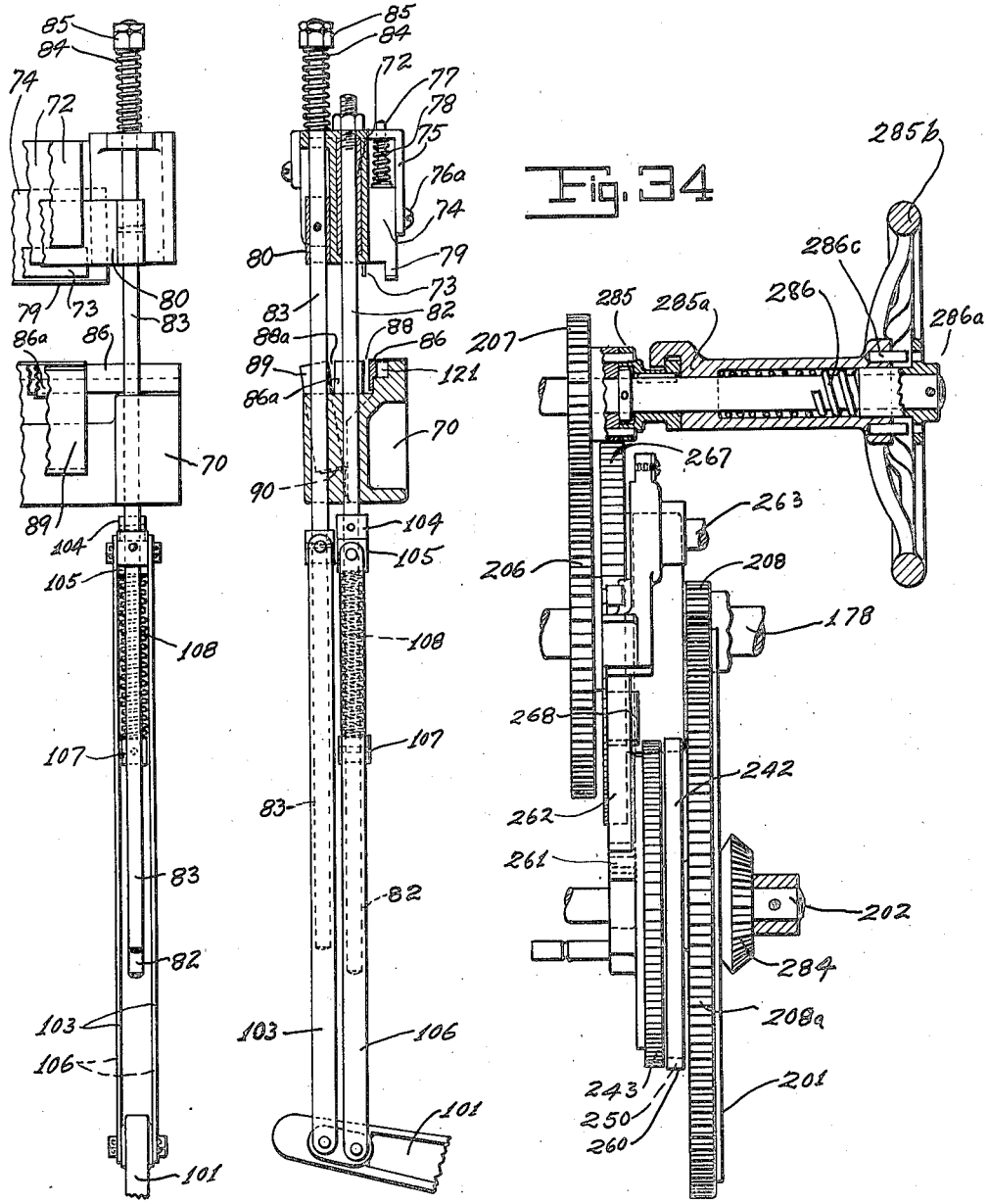

UNITED STATES PATENT OFFICE.

BENJAMIN W. TUCKER, OF SOUTH ORANGE, NEW JERSEY.

MACHINE FOR MAKING WINDOW-SHADES.

1,070,640.  Specification of Letters Patent.  Patented Aug. 19, 1913.

Application filed July 19, 1911. Serial No. 639,309.

*To all whom it may concern:*

Be it known that I, BENJAMIN W. TUCKER, a citizen of the United States, and a resident of South Orange, county of Essex and State of New Jersey, have invented certain new and useful Improvements in Machines for Making Window-Shades, of which the following is a full, clear, and exact description.

This invention relates more particularly to machines for forming window shades from a long web of fabric such as disclosed in my Patent No. 976,949, dated November 29th, 1910.

One of the principal objects of the invention is to provide simple and efficient means which will feed the shade material as a long web and which has means whereby the shade may be cut transversely and a loop formed at one end thereof to hold the shade slat, and at the same time provide means whereby the machine may be quickly and easily set to accurately measure the length of shade and which will stop the feed when the proper length of shade material has been fed forward.

Other objects of the invention are to provide simple and efficient means for operating the several parts of the machine; to provide simple means for supporting the web of shade material on the machine and which may be adjusted according to the width of the shade to be made; to provide simple means which will permit the loop-forming mechanism to be readily set to make different sizes of loops for different sizes of shade slats; to provide simple means for supporting the side cutters, to provide simple means for operating the transversely movable cutters, and to provide simple means for operating and for adjusting the supporting means for the shade roller.

Another object of the invention is to provide simple and efficient means whereby the web may be readily threaded between the feed rolls by removing one of the rolls out of normal contact with the other, and which means is so constructed that the feed rolls may be readily placed in operative position.

A further object of the invention is to provide measuring and indicating means for the shade which will permit the operator to quickly adjust or set the machine for the desired length of shade and to readily ascertain the length of the shade being made, and which means is so constructed and so connected to the feed that the feed may be quickly stopped at any desired point in case it should be found that a flaw or bad spot occurs in the shade material, in which case a short shade may be made and the bad place removed from the shade material without the necessity for destroying a part of the material or making a defective shade, and which mechanism or means will cause the machine to be stopped at the same point each time so that the successive shades may be of the same length, or the said means quickly adjusted to make the shade of any desired length as for example one foot to twelve feet.

A still further object of the invention is to provide simple and efficient means whereby the shade may be fed at two distinct periods so that it will not be necessary to draw the forward edge of the shade toward the operator by manual means in order that the same may be attached to the shade roller before being wound thereon.

Another object of the invention is to provide simple and efficient means whereby the shade may be tacked or attached to the shade rollers.

A still further object of the invention is to provide simple and efficient means for accomplishing the various objects set forth, and to provide a machine which may be readily made and assembled and which is easily accessible to the various working parts.

With these and other objects in view, the invention will be hereinafter more particularly described, with reference to the accompanying drawings, which form a part of this specification, and will then be pointed out in the claims at the end of the description.

In the drawings, Figure 1 is a front elevation of one form of machine embodying my invention. Fig. 2 is a plan view. Fig. 3 is a side view on a somewhat enlarged scale looking at that end of the machine on which the measuring mechanism is mounted. Fig. 4 is a vertical section through the machine. Fig. 5 is a fragmentary plan view of a part of the means for releasing one of the feed rolls from the other to permit the webbing to be readily threaded in the machine. Fig. 6 is a vertical sectional view, showing the feed rolls in dotted lines and the mechanism for shifting the position of the smaller feed roll. Fig. 7 is a fragmentary view, partly in elevation, showing the means for adjusting the edge or side trimming knives or cutters. Fig. 7ª is a fragmentary view, partly in section and partly in elevation, showing how the trimming cutters may be adjusted in case of wear. Fig. 8 is a fragmentary view looking at the front of the mechanism shown in Fig. 7. Fig. 9 is a sectional view, showing a part of the loop-forming mechanism and the means for operating a part of the same. Figs. 10, 11, 12 and 13 are fragmentary vertical sections showing various positions of the cross-head and blades, forming a part of the loop-forming mechanism, relatively to that of the crimping part of said mechanism. Fig. 14 is a fragmentary view of one part of the machine showing how the transversely movable knife is operated to be moved across the machine in one direction and then released to permit the same to be forced quickly transversely of the machine to cut the material. Fig. 15 is a sectional view, and Fig. 16 is a detail elevation of the means for limiting the movement of the cross-head and thereby determine the size of the shade-slat loop. Fig. 17 is a detail perspective view of the cutter and holder. Fig. 18 is a fragmentary sectional plan showing the means for supporting and rotating the shade rollers. Fig. 19 is a fragmentary front elevation, partly in section, of the shade roller supporting and operating means shown in Fig. 18. Fig. 20 is an end view of the mechanism shown in Figs. 18 and 19. Fig. 21 is a plan view and Figs. 22 and 23 are front views of one means that may be employed for quickly adjusting the supporting means for the ends of the shade roller. Fig. 24 is a fragmentary front elevation of a part of the tacking means. Fig. 25 is a sectional view taken on the line XXV—XXV of Fig. 24, showing the means for tacking the webbing to the shade rollers. Fig. 26 is a fragmentary front view, and Fig. 27 a vertical section of part of the mechanism for automatically actuating the tacking means. Fig. 28 is a plan view, partly in section, of a part of the measuring and feed mechanism. Fig. 29 is a side elevation, partly in section, of the mechanism shown in Fig. 28. Fig. 30 is a fragmentary plan view of a part of the measuring mechanism. Fig. 31 is a side elevation, partly in section and partly broken away, of the mechanism shown in Fig. 30. Fig. 32 is a fragmentary plan view of a part of the mechanism shown in Fig. 31. Fig. 33 is a vertical section of a part of the indicator of the measuring mechanism. Fig. 34 is a front elevation of a part of the operating mechanism and feed for the shade material; and Figs. 35 and 36 are fragmentary views of a part of the mechanism for reciprocating the cross-head and loop-forming blades.

The machine frame 10 may be of any suitable construction, and extending transversely of the machine is a rod 11 along which may be adjusted two supports 12 adapted to hold a roll of fabric or material from which a window shade may be made. These supports or devices 12 comprise a bracket 13 in the upper end of each of which is a stud portion or center 14 to support the fabric. Each bracket is divided and said divided portion is arranged to be engaged by a threaded rod 15, on one end of which is a handle 16 which may be employed to cause the divided part of the bracket to clamp or to grip the shaft or rod 11, or to be released to permit the devices 12 to be adjusted along the said rod 11.

The fabric from which the shade is made is passed between two feed rolls 17 and 18. The feed roll 17 is somewhat larger than the feed or pressure roll 18, and the latter roll is so supported that it may be thrown or moved away from the roll 17 to permit the fabric to be easily passed between said rolls. As shown, the shaft of the feed roll 17 is supported in bearings 19 on the machine frame and the shaft 18ª of the feed roll 18 is supported in yieldingly held boxes 20. These boxes 20 are slidingly held in frames or brackets 21 which are adapted to rest on the upper edge of the sides of the machine frame, and said brackets have arms 22 which are pivoted at 23 to the sides of the machine frame. Each of the boxes 20 are normally forced toward the main feed roll 17 by a spring 24 which surrounds a rod 25, the said rod 25 passing through and slidingly held in a cap 26 of the box bracket 21, and has one end threaded and adapted to move with the feed or pressure roll 18. A hook or catch 27 is arranged near each bearing 19 adjacent to the shaft of the feed roll 17, and located near said shaft is a pin 28, one for each catch 27, and this catch has a hook-shaped portion or end 29 adapted to engage said pin. The catches 27 each have an opening which receives an eccentric 30 and each of said catches 27 is normally forced in a direction to engage its coöperating pin 28 by a spring 31, one end of which is held to a part of the catch opposite the end 29 thereof, and the other end of said spring is held to an arm 32. The arms 32 are connected by a transversely-extending rod 33 which may be formed integral with the arms 32 and the outside thereof covered with wood, as at 34, to permit the arms to be moved manually more readily, and held to the inner end of said arms are the eccentrics 30. These eccentrics are held to shafts 35 one end of which engages the arms 32 and there are pins 35ª also engaging the arms 32 to cause the eccentrics to rotate or move with said arms. When the arms 32 are moved rearwardly in the direction of the arrow by grasping the rod 33, the shafts 35 which support the arms 32 will rotate and move the eccentrics and cause the catches 29 to be disengaged from the pins 28, the arms will then rest on the pins 36. The rod 33 may now be utilized to move the brackets 22 on their pivots 23 and to remove the pressure roll 18 away from the main feed roll 17, thus permitting the fabric to be readily threaded between the rolls. After the fabric has been passed between the rolls properly, the rod 33 may be permitted to cause the rolls to be placed in their proper relation with respect to each other and on further movement of the transverse rod 33 through the eccentrics 30, the catches 27 will again be caused to engage with the pins 28 serving to lock the rolls in their proper positions.

As the fabric is fed forward and where the fabric is wider than the shade that is to be made, the said fabric is trimmed or cut lengthwise thereof to the desired width. One of the cutting or trimming means is normally stationary and the other cutting means for the other edge of the fabric is preferably adjustable to adapt the cutters to trim the fabric for making shades of different widths. As shown, Figs. 7 and 8, two shafts 37 and 38 extend transversely of the machine, and these shafts are provided with splines which are engaged by feathers or keys carried by the cutting means. A disk-like cutter 39 is opposed to a similarly formed cutter 40 to overlap each other in order to cut the fabric with a shearing action. The cutter 39 has a hub 41 which is held to the cutter and fits about the shaft 37. A threaded sleeve surrounds the hub 41 and engages a threaded aperture in the bearing portions of the brackets 41ª and 42. This sleeve has a part to rotate the same and extends through the bracket and bears against the cutter 39 to force the same against the cutter 40 in case of wear. The cutter 40 is not adjustable and both sets of cutters are similarly constructed so far as adjustment is concerned. The cutters 39 are carried by the arms 42ª and the cutters 40 by the arms 43 of the brackets 41ª and 42, and both of said arms of each bracket are formed integral or rigidly held together as desired. The bracket 41ª is normally stationary and the cutters of both brackets are mounted to operate with the shafts 37 and 38, and these shafts 37 and 38 are geared together by the gears 44 and 45 so as to rotate in unison.

The bracket 42 is adjustably mounted on a transversely-extending rod or shaft 47 and this bracket as well as the bracket 41ª may be held by a screw 48 or otherwise to the rod 47 when once positioned on said rod 47. The arm 43 of the bracket 42 is slotted at one edge, as at 52, to engage a lug or guide 53 to guide the bracket in its adjusting movement, and each bearing of the bracket arms 42ª is slotted and may be tightened by a screw 54. The arms 43 of the brackets by a screw 54. The arms 43 of the brackets are located to one side and under the arms 42ª, and projecting downward from the arm 43 of the bracket 41ª is a lug 55 to which is fastened by a stud or otherwise, an endless sprocket chain 56. This chain 56 passes about a sprocket wheel 57 at one side of the adjustable bracket 42 and on the other side around a sprocket wheel 58, the said chain extending transversely of the machine and under the transverse rod 47. The sprocket 58 is held to a shaft 59 journaled in the main frame, and on one end of said shaft is a gear 60 which is in mesh with a gear 61. The gear 61 is held to a shaft 62 and on the shaft 62 is a hand wheel 63 by which the said latter shaft is rotated and by which the sprocket chain 56 may be moved to quickly adjust the bracket 46 and the cutters mounted thereon along the shafts 37 and 38 to a distance corresponding to the width of the window shade to be made. To prevent the shaft 62 from rotating through the vibration of the machine, and while the same is being operated, I continue said shaft inward and secure a collar 64 thereto. This collar 64 is located in a recess in a member 65, and this member has a leather or other friction disk 66 which is adapted to engage a part of the machine frame. The disk member 65 has a sleeve or collar portion 66ª around which is a spring 67. The spring 67 is held between the head of the member 65 and a nut or collar 68 on the threaded end 69 of the shaft 62. By adjusting the nut or collar 68, the tension of the spring 67 may be varied and this will cause a greater or less pressure to be made by the disk 66 against the frame of the machine, but the friction thus caused is not great enough to prevent movement of the bracket 46 through the hand wheel 63, the said member 65 being keyed or otherwise slidingly held to rotate with the shaft 62.

The material after passing the lengthwise trimming cutters is fed forward by the feed rolls 17 and 18 in a position to have the shade-slat loop formed therein. This loop may be formed in various ways. As one means, I provide a transversely-extending beam 70 above which is a vertically movable cross-head 71. This cross-head has a beam member 72 and this member is provided with a blade 73, and vertically movable adjacent said blade is a supplemental clamping member 74. The clamping member 74 is held to move vertically along the member 72 and secured to said member 72 are brackets 75 one end of which are slotted, as at 76, to receive a screw or pin 76ª projecting outward from the supplemental clamping member 74 and which serves to guide said member in its independent movement. The supplemental member has a plurality of rods or pins 77 projecting therefrom around which are springs 78, and these springs are arranged under the brackets 75 and tend normally to force the supplemental member 74 downward, the said member 74 being provided with a projecting edge or rib 79 which is adapted to clamp and hold the shade against the upper surface of the transverse beam 70. A second blade 80 is adapted to move with the cross-head a certain distance and then to have a further and independent movement. This blade 80 is guided within a recess in the cross-head member 72 and bears against the plates 81 and 81ª. The cross-head is fastened to rods 82 located on opposite sides of the machine and the blade 80 is held to rods 83 also at opposite sides of the machine. The rods 83 pass through the cross-head and at their upper ends have springs 84 which are held between the upper surface of the cross-head and the nuts 85, the latter serving to vary the tension of the springs 84. As the cross-head descends, the clamping member 74 will engage the fabric along the upper surface of the transverse beam 70, and owing to the springs 78 will yield permitting the blade 73 to force the fabric or shade material between the transverse plate or member 86 forming a part of the beam 70 and a slidable bar or member 86ª forming a part of the crimping means. The bar 86ª extends along parallel to the part 86 of the beam 70 and is held thereto by means of rods or pins 87 around which are springs 87ª which tend normally to force the bar or crimping member 86ª outward to form a slot 88 into which the fabric or shade material may be forced, the said bar 86ª serving to arrest the downward movement of the cross-head and to hold the fabric between the upper surface thereof and the lower surface of the member 72. On further movement of the rods 83, as will be presently described, the blade 80 will be forced into the slot or opening 88ª between the member 86ª and a pivotally held crimping member 89. This member 89 is hinged at 90 to a part of the beam member and extends transversely of the machine and is adapted to engage the sliding bar 86ª when moved on its pivots or hinges 90. The blades 73 and 80 having forced the material into the slots or openings 88 and 88ª will leave the material in this position when the cross-head is elevated. At this time, the swinging member 89 is forced inward, as will be presently described, and this will force the transversely-extending bar 86ª against the plate 86 which will serve to fix the shade into two distinct creases, a part of which is adapted to fold inwardly, and when in this position will form a loop for the shade slat in a manner somewhat similar to that shown in the patent hereinbefore referred to.

A shaft 91 extends transversely of the machine and this shaft is rotatably held in brackets 92. A plurality of arms 93 are secured to the shaft 92 and in said arms are adjustable pins or bolts 94, the heads of which are adapted to engage the outer surface of the swinging member 89 to move the same inward to crease the material. An arm 95 is secured to the shaft 91 and connected to the lower end of this arm is a link 96, one end of which is connected to an arm 97 of a bell-crank lever 98. The lever 98 is pivoted at 99 and has a handle portion 100 whereby when the said lever is moved on its pivot, the link 96 will operate the arm 95 and will cause the material to be creased transversely.

The rods 82 and 83 are connected to arms 101 which extend inward from a transversely-extending shaft 102. The arms 101 are located at opposite sides of the machine adjacent to the inner sides of the machine frame, and the rods 83 are guided in a part of the machine frame and at their lower ends are connected by links 103 to the arms 101. The rods 82 each have a collar 104 secured thereto and slidable along the rod is a second collar 105. Each collar 105 is connected by links 106 to the arms 101, and interposed between each collar 105 and a collar 107 secured to the rod 82 is a spring 108. It will be seen that as the arms 101 are forced downward, the cross-head and blades will be moved therewith, and as soon as the cross-head is arrested by the transversely-extending and slidable bar 72, the blade 80 may continue to move downward by reason of the yielding effect of the springs 108. This will permit the rods 83 through the links 103 to continue the movement of the blade 80, the extent of the movement of said blade 80 being determined by devices 109 which are located on opposite sides of the machine frame. These devices 109, Figs. 4, 15 and 16, are held by bolts 110 and have a plurality of arms 111 of relatively different lengths so that the said arms may have a movement limited according to which arm or portion is engaged thereby, thus the extent or length of the loop may be varied by simply adjusting the said device.

The shaft 102 extends transversely of the machine and held to said shaft is a treadle 112 which is located substantially central of the machine frame and is normally forced upward by a spring 113, Fig. 1, and on movement of the treadle the arms 101 are forced downward so as to form the shade-slat loop, as already described. One or more counterweights 114 are provided either separate from or integral with arms 115, and these arms are held to the shaft 102 tending normally to balance the parts and also to assist the spring 113 in restoring the cross-head to its normal position.

Before the shade-slat loop is formed, the shade material is cut transversely thereof. This is accomplished by a transversely-movable knife such as shown in detail in Fig. 17, wherein the knife is in the form of a triangular steel blade 116 which is clamped between members of the knife bar 117. The knife bar has a fixed part or member 118 and a detachable part or member 119, the latter being secured between the ends of the knife bar by means of screws 120 or otherwise and which permits the blade to be readily removed to place another in its stead or to sharpen the blade. The knife is held to move transversely of the machine in a groove 121 formed in the upper part of the beam 70, and fastened to one end of the knife is a flexible connection, as a cord or wire 122, one end of which passes outward around a pulley 123, Fig. 14, and around a drum 124. This drum 124 is held to rotate in an arm 125 which is pivoted to a shaft or stud 126 and on this shaft or stud 126 is an arm 127. The arm 125 is normally forced in a direction to carry a part or flange of the drum 124 into engagement with a friction wheel 128, by a spring or otherwise, and this friction wheel is secured to the positively driven cutter shaft 37. When the drum 124 is in engagement with the friction wheel 128, the said wheel and drum will be rotated to wind the flexible connection 122 thereon, and when the arm 125 is forced to carry the drum 124 away from the friction wheel 128, as will be presently described, the drum will be free to rotate on its shaft and will permit the knife to be forced over transversely of the machine in the groove 121 to sever the material from which the shade is made.

To force the transverse cutting knife in a direction to cut the material, I attach to the opposite end of said knife a flexible connection which passes around a drum 130. This drum 130 has two drum members 131 and 132, the knife being connected to the larger member 131 while around the smaller member is passed a wire, cord or other connection 133, to which is fastened a weight 134. This weight 134 is guided between rods 135 which are suitably supported at the end of the machine frame, and held to the lower portion of said rods is a cushion 136 to take the shock of said weight. It will be seen, therefore, that as soon as the friction wheel 128 is released, the weight 134 acting upon the drum will quickly force the knife transversely of the machine, and as soon as the drum 124 again engages the friction wheel 128, the knife will be automatically drawn across the machine ready to again cut the shade material.

The lower end of the arm 127 has an adjustable part or member 137, and this part 137 has a curved or cam portion 138 arranged within the path of the vertically movable pin 139. The pin 139 in this case is carried by one of the arms 101 and on the downward movement of said arms through the actuation of the treadle 112, the said pin will be caused to engage the part 137 and rock the shaft 126 and arm 125 to automatically release the drum 124 from the friction wheel 128, thus causing the knife to be automatically moved across the machine in both directions, it being understood that as soon as the treadle is released to restore the loop-forming cross-head to its normal position, the drum 124 will again be caused to engage the friction wheel 128 and will move the knife back across the machine ready to again cut the material.

The shade material may be tacked or fastened to the roller either by hand or by mechanism which will be hereinafter described, and the shade roller after the shade has been tacked thereto is supported at one end in a chuck 140 and at the other end in a socket or chuck 141. The chuck 140 is detachably held to a threaded stud 142 projecting from a sleeve 143, and this chuck has two pins 144 which are adapted to engage the openings in the end of the shade roller so that when said chuck is rotated, the shade roller will also be rotated to wind the shade thereon. The sleeve 143 is held in a bracket or frame 145 and this bracket is adjustable along a bar 146 which is adjustably held on a table 147. The bar 146 is dove-tailed and is adapted to fit in a similarly formed groove in the base of the bracket 145, and said base is slotted centrally, as at 148, in which is adapted to move an eccentric clamping device 149. The device 149 is secured to a shaft 150 and on one end of the shaft 150 is a handle 151. As will be seen when the handle 151 is operated in one direction, it will throw the eccentric disk 149 downward to engage the upper surface of the bar 146 to frictionally hold the bracket 145 to the bar, and when moved in the opposite direction so that the handle rests upon the pin 152 as shown in the drawings, the said bracket may be moved freely and easily along the bar 146. The sleeve 143 is held to the end of a shaft 153. This shaft 153 is held to rotate with a sleeve 154, and said sleeve is journaled in a bearing 155 of a bracket 156 located at the end of the table 147. A pulley 157 is held to rotate with the sleeve 154 and shaft 153, and said shaft 153 is square or otherwise made in cross-section to adapt the same to rotate with the pulley 157 and sleeve, and at the same time permit lengthwise movement of the shaft to adapt the chuck bracket 145 to be adjusted along the table 147 as already described in order that different lengths of shade rollers may be properly supported and rotated. This pulley 157 is connected by a belt 158 to a drive pulley 159, which latter is held to rotate with the cutter shaft 37, the said belt having sufficient slack to permit the belt to slip in winding the shade on the roller, but at the same time not too slack to permit the belt to rotate the roller properly to wind the shade thereon.

The bar 146 has a bracket 160 adjustably held thereto and in which the chuck 141 is rotatably held. The chuck 141 has an opening to receive the pin at the end of the shade roller and is in the form of a shaft 161 which is held to rotate in the bearings 162 and 163 of the bracket 160, although the shaft 161 may remain normally stationary if desired.
One end of the shaft 161 is supported in a sleeve 164 in the bearing 162 and secured to said shaft on the inside of the bearing 161, is a collar 165, and interposed between the collar 165 and the sleeve 164 is a spring 166.
The bracket 160 may be adjusted along the bar 146 by means of a handle 167 which operates an eccentric element 168. The handle and the eccentric element 168 are substantially the same and are operated in the same manner as the eccentric block or element 149 or the chuck bracket 145, and which permits the bracket 160 to be adjusted toward or from the bracket 145 according to the width of shade to be made, the spring 166 tending normally to hold the shade roller properly between the chucks 140 and 141. A plurality of bolts 169 extend downward through the table 147 from the bar 146, and on the lower end of each bolt is a boss or part 170 from which projects studs 171 and 172 on each of which is a roller 173. The bolts 169 pass through the slot in the table 147 and the rolls 143 are adapted to engage the under surface of the table on opposite sides of the slot to guide the bar 146 during its lengthwise adjustment. The bar 146 moves under a bracket 156 and has one end secured to a threaded bolt or projection 174. A threaded sleeve 175 engages the threaded stem 174 and this sleeve is supported in a bracket 176 and has one end provided with a handle 177 by which the said sleeve may be rotated, so that by rotating the handle 177 in either direction, the bar 146 may be moved bodily along the table and thereby move both the brackets 145 and 160 at the same time in order to properly aline the chucks. By this means, different widths of shades may be readily compensated for through the independent adjustment of the supporting chucks, and the said chucks may be simultaneously moved by the adjustment of the bar to which the chuck brackets are held.
It is very desirable that the machine be constructed so that different lengths of shades may be made as well as shades of different widths, and it is desirable that the machine be made so that it will automatically stop the machine when sufficient fabric has been fed forward to make a shade of the desired length. It is also desirable that the shade be accurately measured and the machine so constructed that it may be quickly set for the desired length of shade, and further that the machine may be stopped at will at any time in case a flaw should occur in the fabric and a shade made of that part of the fabric which is good although it may differ in length from the other shade or shades. To effect these results, various means may be employed. As shown, Figs. 3, 28 to 33, one means is provided for accurately measuring different lengths of shades and for automatically stopping the machine at a point when the proper amount of shade material has been fed forward.

A shaft 178 is mounted on one side of the machine, and held to rotate independent of the shaft is a pulley 179 which may connect by a belt or otherwise to a pulley 180 on the main drive shaft 181, there being a main drive pulley 181$^a$ on said shaft. A collar 182 forms a part of a suitable clutch or clutch mechanism 182$^a$ and has a pawl 183 pivoted thereto at 184, and this pawl has a tooth 185 adapted to engage teeth 186 within the hub of the pulley 179. The pawl 183 has one end engaged by a spring 187 which is seated in the collar 182 and said spring tends normally to force the pawl into engagement with the teeth 186, while the other end of said pawl is adapted to be engaged by a spring-pressed bolt or pin 188. The bolt 188 is held in a lug 189 and located at a distance around the shaft from the lug 189 is a part 190 which is adapted to be engaged by a tooth 191 of the collar 182. The part 190 and lug 189 are carried by a friction element or wheel 192, and when said wheel is held stationary as will be presently described, the spring-pressed pin or bolt 188 will force the pawl out of engagement with the teeth 186, thereby permitting the pulley 179 to rotate independently, but as soon as the pin 188 is positioned so that the spring 187 will force the pawl 183 into engagement with the teeth 186, the pulley 179 will thereby become fixed to the collar 182 and will rotate therewith. The collar 182 is fixed to the sleeve 193 on which the rotating element 192 or wheel is loosely mounted and held to the wheel 192 is a ratchet wheel or member 194.

A short shaft or stud 195 is mounted on the frame parallel to the shaft 178 and near the ratchet wheel 194, and loose on the shaft 195 is a pawl or dog 196. The dog 196 is adapted to engage one of the teeth 197 on a part of the friction element or wheel 192, tending normally to hold said wheel against rotary movement and thereby causing the clutch mechanism to permit the pulley 179 to rotate independently of the sleeve 193. The dog 196 is movable with an arm 198 and on the end of said arm 198 is a trundle 199 which enters a cam grooves 200 in a wheel 201. This wheel 201 is secured to a shaft 202 and said cam wheel has a recess 203 and a cam portion 204. The purpose of this recess 203 and cam portion 204 is that when the dog 196 is operated, as will be presently described, to disengage the same from one of the teeth 197, the trundle 199 will be permitted to move into the recess 203 and this will permit the friction wheel 192 to rotate with the pulley 179 but only one-half of a revolution and until the dog 196 again engages the next tooth 197. There are two teeth 197 and as soon as the arm is moved to disengage the dog 196, a spring 204ª which is connected at one end to a part 204ᵇ movable with the arm 198, will return the arm and dog to engaging position. As the wheel 201 rotates, the cam 204, which is for emergency purposes and in case the spring 204ª does not act for any reason, will engage the trundle 199 and force the arm 198 inward and likewise the dog 196, thereby stopping the rotation of the friction wheel 192 and also the ratchet wheel 194 which will so actuate the clutch as to permit the pulley 179 to rotate independently. This partial rotation of the sleeve 193 causes the fabric to be fed forward a distance far enough to permit the outer edge to be attached to the shade roller and then the feed stopped.

The shaft 178 has a sleeve 205 spaced from the sleeve 193, and held to this latter sleeve 205 is a gear 206 which meshes with a smaller gear 207 on the shaft of the main feed roll, so that when the clutch 182ª operates, the feed roll 17 will be rotated to feed the fabric, and when said clutch is stopped, the feed will also stop. The sleeve 193 is provided with a pinion 208 which meshes with the large gear 208ª forming a part of the cam wheel 201 and by which the latter is rotated.

To disengage the dog 196 from engagement with either of the teeth 197, an arm 209 is fixed to the shaft 195 and the lower end of said arm 209 is connected to a rod 210. The rod 210 passes through a cylinder 211 secured to the inside of the machine frame and the outer end of said rod is connected to an arm 212 of a bell-crank operating lever 213. This lever 213 is pivoted at 214 to the machine frame and is movable about a segment 215 having a single engaging tooth or portion 216. A catch or pawl 217 is pivoted at 218 to the operating lever 213, and said catch or pawl has a handle portion 219 which is normally forced in one direction by means of a spring 220 carried by the lever 213 so that when the lever 213 is in the position shown in Fig. 29, the catch 217 will engage the part or tooth 216 and will hold the lever against movement, but by releasing the catch 217 through the handle 219, the lever 213 may be moved and thereby force the rod 210 outward to move the arm 209. The rod 210 has a collar 221 fixed thereto within the cylinder 211 and a collar 222 fixed thereto on the outside of the same. Two collars 223 are loosely held on the shaft or rod 210 and interposed between the collars 223 is a spring 224. When the parts are in the position shown in Fig. 29, the spring 224 is under compression and as soon as the lever is released, the spring 224 will tend to force the rod 210 outward until the collar 223 engages the inner portion 225 of the cylinder, and on further movement of the lever 213 on its pivot the collar 222 will engage one of the loose collars 223 which will again compress the spring 224 according to the distance the said lever is moved, thus the spring tends to balance the parts in a way and serves also to tend to keep and hold the lever 213 in a position intermediate of that shown in Fig. 29 and its extreme movement.

The shaft 195 carries an arm 226 and mounted on this arm is a pawl or dog 227. This pawl is secured to a shaft 228 carried by the arm 226 and also secured to the shaft 228 is a bell-crank lever 229. One arm of the bell-crank lever, as arm 230, is connected by a spring 231 to a lug or projection 232 and tends normally to force the pawl 227 into engagement with a tooth 233 carried by a boss formed as a part of the trundle arm 198. The arm 234 of the bell-crank lever 229 is held to have a sliding movement as the shaft 195 is rotated, and this sliding movement is effected by a screw or bolt 235 secured to a bracket on one part of the machine. As the arm 226 is moved, the screw 235 will by holding the arm 234 of the bell-crank 229 against rotation rock the shaft 228 and disengage the pawl 227 from the tooth 233, thereby permitting the spring 204ª to quickly restore the arm 198 and dog 196 to the position shown in Fig. 29.

An arm 238 is secured to the shaft 195 and this arm carries a dog 239 which is adapted to engage the teeth 240 of the ratchet wheel 194. This ratchet wheel is movable with the clutch friction wheel 192, and when said dog 239 engages the teeth 240 of said ratchet wheel, the friction wheel will be held stationary thus holding the sleeve 193 also stationary and permitting the pulley wheel 179 to rotate independently and loosely and thereby stop the feed.

As will be seen when the arm 209 is moved, it will rotate the shaft 195 and will disengage the dog 229 from the teeth of the ratchet wheel 194. This is accomplished through the rod 210 and the lever 213 as already explained, and as the shaft 195 is moved to disengage the dog 239 the arm 226 which is fixed to the shaft 195 will also be moved and this will carry the pawl 227 therewith so as to rock the arm 198 on the shaft 195 thereby disengaging the dog 196 from engagement with one of the teeth 197 on the friction wheel 192. The free end of the arm 198 will move within the recess 203 of the cam groove 200 and owing to the pawl 227 being fixed to the shaft 228 carried by the arm 226 the bell-crank lever 229 will disengage the pawl 227 from the tooth 233 forming an extension on the arm 198 which will permit the spring 204ª to force the arm 198 back to its normal position and to place the dog 196 in position to engage the next tooth 197. Thus the friction wheel 192 will be given a part of a revolution which will be sufficient to feed the fabric forward for attachment to a shade roller as will be hereinafter explained. The movement of the feed will cause the pinion 208 which is fixed to the sleeve 193 to rotate therewith and this pinion which is in mesh with the large gear 208ª will rotate said gear, the latter being formed as a part of or connected to rotate with the cam wheel 201. This movement will cause the trundle 199 to pass beyond the cam portion 204 and into the cam groove 200 which will lock the dog 196 out of position to engage either one of the teeth 197.

To set the machine so that the shade material may be fed forward to any desired length according to the length of the shade to be made, and then to automatically stop the machine when the proper length has been fed forward various means may be employed. As shown, a cam 242 is held to move independently of the cam wheel shaft 202 and arranged to be movable relatively to the cam and shiftable around the shaft 202 is a ratchet wheel 243. A worm wheel 244 is loosely held on the shaft 202 and is fixed to move with the cam 242, and engaging the worm wheel 244 is a worm 245. The worm 245 is fastened to a shaft 246 which is rotatably held in brackets 247 and 248 secured to the machine frame, and on the outer end of said shaft is a hand wheel 249 by which the shaft 246 may be moved to impart movement to the cam 242 about the shaft 202. The cam is provided with a notch 250 which extends somewhat below the depth of the teeth of the ratchet wheel 243. This notch 250 is so positioned relatively to the end 251 of an arm 252 carried by the cam wheel that the position of this notch with respect to said end 251 will determine the length of shade to be made as will be hereinafter described. The arm 252 has a tooth 254, and this tooth is adapted to engage any one of the teeth of the ratchet wheel 243 but said tooth is normally held disengaged by reason of the end 251 riding upon the peripheral surface of the cam 242. As soon as the cam wheel 201 rotates far enough to permit the end 251 to enter the notch or recess 250 of the cam 242 the tooth 252 will then engage the teeth of the ratchet wheel 243 and will impart a movement thereto. The arm 252 is held to a shaft 255 and on this shaft is an arm 256 which is forced in one direction by a spring 257, one end of which is secured to the arm 256 and the other end to a pin 258 carried by the cam wheel 201. This spring 257 tends normally to force the tooth 254 into engagement with the ratchet wheel 243, the said ratchet wheel being normally held against movement by a spring 259 which serves also to restore the cam to its normal position. The ratchet wheel has only a short movement through the tooth 254 and said tooth will then be again disengaged from the ratchet wheel 243 by reason of the end 251 of the arm 252 riding upon the cam surface 260 forming a part of the notch 250.

A bracket or stop 261 is carried by the ratchet wheel 243 and this bracket is adapted to engage an arm 262. This arm 262 is supported on a shaft 263, and said arm is normally forced inward by a spring 264, one end of which is held to one end of the arm 262 and its other end attached to a bracket 265 secured to the machine frame. The arm 262 carries a dog 265ª and this dog is adapted to engage the teeth of a ratchet wheel 266 which is formed as a part of a friction wheel 267. The friction wheel 267 is held to rotate loosely on the sleeve 205 and said wheel forms a part of a clutch or clutch mechanism 267ª which is substantially the same as shown in connection with the pulley wheel 179 and is adapted through said clutch to operate the sleeve 205 and through the gear 206 stop the feed as already explained. The dog 265 engages the teeth of the ratchet wheel 266 as soon as the ratchet wheel 243 on the shaft 202 has moved far enough to carry the bracket 261 out of engagement with the arm 262. The machine so far as the drive shaft and the cam wheel 201 is concerned will continue to rotate until it makes a complete revolution. A pin 267ᵇ is carried by the cam wheel 201 which is adapted to engage a part 268 on the arm 262 at the end of the movement of the complete revolution of the machine which will raise the end of the arm 262 out of the path of the bracket 261. The spring 259 will now force the ratchet wheel 243 back to its normal position, and at the time that the pawl 265ª becomes disengaged the dog 196 will be engaged by one of the teeth 197 and this will hold the friction wheel 192 stationary so that the clutch 182ª of the pulley 179 will remain inoperative and thus stop the feed.

To permit the operator to ascertain immediately what adjustment has been made of the parts so that it can be readily determined when the machine will be stopped and the exact length of shade made, and also to determine at what point the feed has been stopped as can be done at any time, I provide suitable indicating mechanism 269, Figs. 30, 31 and 33. This mechanism includes a circular dial 270 and two pointers 271 and 272 which are adapted to move about the dial, the latter being graduated into feet and fractions thereof. The pointer 272 is for the purpose of indicating the point at which the machine is set so that the feed will automatically stop when the desired length of shade has been made. This pointer 272, Fig. 33, has a boss which is secured to a tubular shaft 273, and this shaft is held to rotate at its upper end in a bracket or bearing 274, and at its lower end in a boss or bearing 275 of the bracket 265, the said brackets 274 and 265 being secured to the side of the machine frame. The tubular shaft 273 is provided with a collar 276 at its lower end to properly hold the same in its bearing 275, and secured to said shaft is a worm wheel 277, the teeth of which are engaged by a worm 278, Fig. 30, which is held to a shaft 279. The shaft 279 may have one end journaled in the bracket or bearing 265 and the other end in the bracket 248, and on the end of said shaft is a bevel gear 280 which is in mesh with the gear 281 on the hand-operating shaft 246. It will be seen that when the hand wheel 249 is rotated to rotate the shaft 246 for the purpose of imparting a relative movement to the cam 242 which determines the point at which the feed is to stop, a like movement will be imparted to the shaft 279. This will rotate the worm wheel 277 and the tubular shaft 273, which will carry the pointer 272 about the dial to indicate the length of shade that is to be made. A number of shades may be made of this length without changing the machine, and the feed will always stop at this point without again adjusting the indicator and the cam 242 as already explained, or the machine may be adjusted to make shades of any desired length within the field of adjustment.

The pointer 271 is secured to a shaft 282 which passes through the tubular shaft or sleeve 273, and at the lower end of said shaft is a bevel gear 283 which is in mesh with the bevel gear 284 secured to the cam wheel 202. As the shaft 202 and cam wheel 201 rotate, the pointer 271 through the shaft 282 will also be rotated and this pointer will always move as the machine continues to move until it returns to zero, the purpose of the pointer 271 being to indicate where the machine is stopped by the operation of the hand-operating lever 213. This dog 239 may be utilized as an emergency device at any time by operating the lever 213 to throw the dog 239 into engagement with the teeth 240 of the ratchet wheel 194 in case a flaw should occur in the fabric and it is desired to stop the machine in order that a different length shade may be made for the purpose of utilizing that part of the fabric which is not ruined by such flaw and then the machine can be started again in the manner as already explained.

The invention thus far described will be readily understood from the foregoing description taken in connection with the accompanying drawings. The fabric as a roll is properly supported on the spindles 14 of the brackets 13 and is threaded between the feed rolls 17 and 18 and fed forward as already described, and as it is fed forward the trimming knives upon the shafts 37 and 38 will accurately trim the shade lengthwise the proper width. When the machine is first started, the material is first trimmed transversely through the operation of the transverse cutting knife 116 which may be forced transversely of the machine. This can be done without starting the machine by releasing the drum 124 from the roll 128 by a downward movement of the treadle 112. The pulley 179 rotates loosely and freely about the shaft 178, and owing to the ratchet wheel 194 and the friction wheel 192 of the clutch 182$^a$ being held against movement the feed rolls 17 and 18 will remain stationary. As soon as the operating lever 213 is thrown upward to move the rod 210, this will force the arm 209 therewith and at the same time throw the dog 239 out of engagement with the teeth 240 of the ratchet wheel 194. The arm 226 being fastened to the shaft 195 will be moved upward and during this movement will cause the pawl 227 carried thereby to engage the tooth 233 to throw the arm 198 carrying the trundle 199 of the cam arm upward into the recess 203 of the cam wheel 201. The dog 196 being held to move with the arm 198 will be shifted to a position out of the path of the tooth 197 on the friction wheel 192 of the clutch 182$^a$ which will permit the friction wheel to rotate through the clutch with the pulley 179, and through the sleeve 193 and clutch operate the gears 206 and 207 and the feed rolls 17 and 18. The bell-crank lever 229 which is held to the shaft 228 on which is the pawl 227, will by its engagement with the head of the bolt 235, force the pawl 227 out of engagement with the tooth 233, and this will permit the spring 204$^a$ to force the arm 198 back into the position shown in Fig. 29, and in position to engage the next tooth 197 of the friction wheel and thereby stop the feed. This is what I term the initial feed and the purpose of the same is to feed the fabric preliminarily far enough forward for its attachment to a shade roller. During this preliminary feed, the cam wheel 201 continues to rotate, and should the spring 204$^a$ not act, the cam part 204$^b$ on the cam wheel will force the arm back into position to engage the next tooth to be sure that the preliminary feed is properly effected. This inward movement of the arm 198 will cause the dog 239 to again engage the ratchet wheel 240 of the ratchet wheel 194 which will hold the friction wheel against movement and thereby stop the entire operation of the machine. The end of the fabric having been attached to the shade roller and the latter supported as already explained, and the machine set to automatically stop the machine through the operation of the hand wheel 249 to position the pointer 272 properly to indicate the proper length of shade as hereinbefore explained, the machine may now again be started to complete the shade by the upward movement of the handle 219 of the lever 213 which, by the operation of the rod 210 and arm 209 connected to said rod, will disengage the dog 239 from the teeth of the ratchet wheel 194. After the preliminary feed the trundle 199 of the arm 198 is on the opposite side of the cam 204 and the cam groove is of such shape that it prevents the spring 204$^a$ from again forcing the dog 196 in position to stop the feed until the cam wheel 201 has made one complete revolution. However, the lever 213 can be operated at any time to force the arm 209 in position to throw the dog 239 into engagement with the teeth of the ratchet wheel 194 to stop the machine in case it is desired to do so, either for emergency or for other reasons, such for example when a flaw occurs in the fabric and it is desired to stop the machine to trim the fabric and remove the flaw and at the same time permit a shade to be made from the fabric. If the lever 213 is not operated to stop the machine and the machine continues to rotate, the arm 252, Fig. 31, the end of which moves about the cam 242, will move with the cam wheel 201 and as soon as it reaches the notch 250 in said cam wheel it will enter said notch and cause the tooth 254 to engage the teeth of the ratchet wheel 243. This will cause the bracket 261 to move beyond the end of the arm 262 which carries the dog 265$^a$, and as soon as this is done, the spring 264 will force the arm inward and cause the dog 265$^a$ to engage the teeth of the ratchet wheel 266. This ratchet wheel forms a part of the clutch mechanism 267$^a$ and by reason of the connection with the sleeve 205, will hold the gear wheel 206 against rotation, thus stopping the feed but at the same time permitting the pulley 179 through its coöperating clutch mechanism 182$^a$ to continue to rotate the cam wheel 201 through the small gear or pinion 208 on the sleeve 193 and which engages the teeth of the gear wheel forming a part of the cam wheel 201. The cam wheel 201 continues to rotate and about the time when it has completed its revolution the pin 267$^b$ carried thereby will engage the part 268 on the arm 262 and force said arm 262 outward beyond the bracket 261 which will permit the spring 259 to restore the ratchet wheel 243 to its normal position and carry the bracket 261 under the arm 262 to hold the dog 265$^a$ disengaged from the teeth of the ratchet wheel 266. This disengagement with the arm 262 should correspond in time with the engagement of the dog or tooth 196 with one of the teeth 197 of the clutch friction wheel 192.

If it is desired that the length of shade should be changed, this can be done by rotating the hand wheel 249 which will change the position of the notch 250 relatively to the position of the tooth 254 carried by the arm 252, and this movement will correspondingly change the position of the pointer 272 to indicate the length of shade which is being made and the corresponding position of the parts of the measuring mechanism.

It is desirable at times to rotate the feed by hand, and to permit this to be done, I mount the gear 207 loosely on the shaft of the feed roll 17. The gear 207 has a hub forming one member of a suitable clutch 285, the other member being provided with openings to receive pins projecting from the first-mentioned clutch member. The outer member of the clutch is slidingly held to the feed roll shaft and has a collar which is engaged by a finger or part of a sleeve 285$^a$. On the outer end of the sleeve 285$^a$ is a hand wheel 285$^b$ which is held thereto or formed as a part thereof. The sleeve member 285$^a$ is slidably held to the roll shaft and is adapted to disengage the members of the clutch 285 when moved outward. A spring 286 is arranged around the roll shaft within a recess in the member 285$^a$ and has one end engaging a collar 286$^a$ held to said shaft, the tendency of the spring being to hold the clutch members in engagement so that the gear 207 will be normally fixed to the roll shaft. The hand wheel 285$^b$ has its hub forming one member of a clutch 286$^c$, the other member being formed on the collar 286$^a$. This clutch is substantially the same as the clutch 285 and the members thereof are held normally disengaged. By pulling the hand wheel 285$^b$ outward to disengage the members of the clutch 285, the members of the clutch 286$^c$ will be brought into engagement and the shaft and roll 17 may be rotated independently of the feed mechanism, and as soon as the hand wheel is released, the spring 286 will force the clutch teeth into engagement again. In case of an abrupt stop of the feed roll, the hand wheel may rotate independent of the roll shaft and thereby prevent breakage of parts as might otherwise occur.

The end of the shade may be tacked or fastened to the shade roller either manually or by mechanism forming a part of the machine. As shown, Figs. 24 to 27, the main drive shaft 181 has a pinion 287 at one end thereof and may have a fly-wheel 287ª to assist in making the machine run evenly. The pinion 287 is in mesh with a gear 288 of a clutch mechanism 288ª which is substantially the same as the clutch mechanism shown in Fig. 29. The gear 288 rotates loosely on the shaft 289 and on this shaft is a disk 290 having a tooth 291 which is adapted to be engaged by the end or dog 292 of a lever 293. The lever 293 is normally forced in one direction or in engaging position by a spring 294 and serves when engaging the tooth 291 to hold the shaft 289 against movement through the clutch mechanism 288ª. The lever 293 is held to a shaft 296 and movably held on this shaft is a lever 297, one arm of which, as 298, is normally forced in one direction by a spring 299, and in the opposite direction by a rod 300, one end of which is connected to a treadle 301. This treadle 301 has a foot piece 302 at one end and is pivoted at 303 to a bracket which may be held to the floor. The other arm 304 of the lever 297 is provided with a pawl 305 which is pivoted at 306 to the arm 304 and said pawl has an arm 307 carrying a bolt or screw 308 which may be adjustably held in said arm 307 and is adapted to engage a part 309 of the machine frame. As will be seen, when the treadle 301 is forced downward, the part 292 of the lever 293 will be released from engagement with the tooth 291 of the clutch disk 290 and as the pawl 305 is advanced by the arm 304, it will be disengaged from the tooth 310 of the arm 311 which like the end or dog 292 is fixed to the shaft 296. The spring 294 will then throw the dog 292 of the lever 293 inward again in position to again engage the tooth 291 when the shaft 289 has made a complete revolution through its clutch mechanism 288ª. An eccentric 312 is secured on opposite sides of the machine to the shaft 289 and each eccentric is adapted to operate a strap or eccentric rod 312ª each of which is connected to an arm 313 which is held to a shaft 314. The shaft 314 is provided with a plurality of arms 315 corresponding to the number of tacks or tacking elements it is desired to drive into the shade roller for fastening the ends of the shade thereto. Each arm has a boss 316 in which is a plunger or hammer 317, one end of which has a head 318 which is normally forced outward by a spring 319 arranged within a recess in the boss 316. Each head 318 is adapted to engage and operate a plunger 320 of a tacking device 321, which may be of the usual or of any preferred construction, such for example as that ordinarily employed for cutting and driving a staple. As the shaft 314 is rocked, the arms 315 will also be rocked and through the hammers 318 will operate the plungers 320 of the staple devices or machines and will simultaneously force a plurality of staples into the shade roller, an anvil or backing device 322 in the form of a bar, Fig. 4, being provided to take the blow due to the impact of the plunger 320 during the stapling operation.

From the foregoing, it will be seen that an effective machine is provided whereby a web of fabric or shade material may be accurately fed to the loop-forming mechanism; that simple means is provided whereby the feed rolls may be readily positioned for threading the machine; that simple means is provided whereby the shade fabric may be moved at two distinct periods, one as the preliminary feed and the other as the final feed; that simple means is provided whereby the shade may be accurately measured; that simple means is provided for regulating the size of the shade slat loops; that simple and effective means is provided whereby the feed may be stopped for emergency or other purposes; that simple means is provided whereby a shade may be made so as to utilize a part of the fabric in case a flaw should occur therein; that simple and efficient means is provided whereby the shade may be tacked to the shade roller by the machine; that simple and efficient measuring mechanism is provided; and that said machine is simple in construction and is adapted to make shades of different lengths and trim the same accurately.

Having thus described my invention, I claim as new and desire to secure by Letters Patent:—

1. In a window shade machine, the combination with means for supporting shade slat material, of means for forming a shade slat loop, means for trimming the material lengthwise the right width, a knife movable transversely of the machine to cut the material, means for automatically actuating the knife, means for fastening the end of the shade to the shade roller, means for feeding the material for a portion of a predetermined shade length and then stopping the feed and subsequently feeding the remainder of said shade length, together with means whereby the feed may be stopped at any point without stopping other parts of the machine.

2. In a window shade machine, the combination with means for supporting shade material, of feed mechanism, means for forming a shade slat loop, a knife movable transversely of the machine to cut the material, means for automatically actuating the knife, together with means whereby the feed may be stopped at any point intermediate of a predetermined shade length without stopping other parts of the machine.

3. In a window shade machine, the combination with means for supporting shade material, of means for forming a shade slat loop, a knife movable transversely of the machine to cut the material, means for fastening the end of the shade to the shade roller, means for feeding the material for a portion of a predetermined shade length and then stopping the feed and subsequently feeding the remainder of said shade length, together with means whereby the feed may be stopped at any point without stopping other parts of the machine.

4 In a window shade machine, the combination with means for supporting shade material, of feed mechanism, means for forming a shade slat loop, together with means whereby the feed may be stopped at any point intermediate of a predetermined shade length without stopping other parts of the machine.

5. In a window shade machine, the combination with means for supporting shade material, of means for forming a shade slat loop, means for trimming the material lengthwise the right width, a knife movable transversely of the machine to cut the material, means for automatically actuating the knife, means for feeding the material for a portion of a predetermined shade length and then stopping the feed and subsequently feeding the remainder of said shade length, together with means whereby the feed may be stopped at any point without stopping other parts of the machine.

6. In a window shade machine, the combination with means for supporting shade material, of feed mechanism, means for forming a shade slat loop, means for trimming the fabric lengthwise the right width, a knife movable transversely of the machine to cut the material, means for automatically actuating the knife, together with means whereby the feed may be stopped at any point intermediate of a predetermined shade length without stopping other parts of the machine.

7. The combination with means for supporting shade material, of means for forming a loop for the shade slat, feeding means for the material, a clutch mechanism for operating the feed, means for controlling the clutch mechanism to stop the feed, a second clutch mechanism adapted to operate or stop the feed, means for controlling said second clutch mechanism, together with means for stopping one of the clutch mechanisms at the same time that the other clutch mechanism is released.

8. The combination with means for supporting shade material, of means for forming a loop for the shade slat, feeding means for the material, a clutch mechanism for operating the feed, means for controlling the clutch mechanism to stop the feed, a second clutch mechanism adapted to operate or stop the feed, and means for controlling said second clutch mechanism.

9. The combination with means for supporting shade material, of means for forming a loop for the shade slat, feeding means for the material, mechanism for operating the feed, means for controlling said mechanism to stop the feed, a second mechanism adapted to operate or stop the feed, and means for controlling said second mechanism.

10. In a window shade machine, the combination with a feed roll, of two clutch mechanisms operatively connected to said feed roll, means whereby the two clutch mechanisms may operate together or independently to rotate said roll, means for controlling each clutch mechanism, and means whereby one clutch mechanism may rotate the feed to feed the shade material a certain distance and then stop and the machine continue to operate, the second clutch mechanism then operating to automatically stop the feed.

11. In a window shade machine, the combination with feeding means, of two clutch mechanisms operatively connected to said feeding means, means whereby the two clutch mechanisms may operate together or independently to rotate said roll, and means for controlling each clutch mechanism.

12. In a window shade machine, the combination with feeding means, of two clutch mechanisms operatively connected to said feeding means, and means whereby one clutch mechanism may rotate the feeding means a certain distance and then stop and the machine continue to operate, the second clutch mechanism then operating to automatically stop the feed.

13. In a window shade machine, the combination with feed mechanism, of a shaft, sleeves independently mounted on the said shaft, clutch mechanisms mounted upon the sleeves and connected to operate the feed mechanism, a ratchet wheel coöperating with each clutch mechanism, a dog adapted to engage each ratchet wheel, means for manually operating one of the dogs, together with means for automatically actuating the other dog whereby the feed may be stopped and the machine continue to operate and then the machine as well as the feed stopped.

14. In a window shade machine, the combination with feed mechanism, of a shaft, sleeves independently mounted on the said shaft, clutch mechanisms mounted upon the sleeves and connected to operate the feed mechanism, a ratchet wheel coöperating with each clutch mechanism, a dog adapted to engage each ratchet wheel, together with means whereby the feed may be stopped and the machine continue to operate and then the machine as well as the feed stopped.

15. In a window shade machine, the combination with feed mechanism, of clutch mechanisms connected to operate the feed mechanism, a ratchet wheel coöperating with each clutch mechanism, a dog adapted to engage each ratchet wheel, and means for independently operating the dogs.

16. In a window shade machine, the combination with means for supporting shade material, of means for forming a shade slat loop, feeding means for the material, two clutch mechanisms, a pulley coöperating with one of the clutch mechanisms, a ratchet wheel coöperating with each clutch mechanism, a shaft, a dog carried by the shaft, an arm for moving the dog out of engagement with one of the ratchet wheels, a rod connected to the arm, means for manually operating the rod whereby the dog may be thrown into or out of engagement to cause the feed to operate or to be stopped, together with means coöperating with the other ratchet wheel and clutch mechanism whereby the feed may be stopped through said mechanism.

17. In a window shade machine, the combination with means for supporting shade material, of means for forming a shade slat loop, feeding means for the fabric, two clutch mechanisms, a pulley coöperating with one of the clutch mechanisms, a ratchet wheel coöperating with each clutch mechanism, a shaft, a dog carried by the shaft, an arm for moving the dog out of engagement with one of the ratchet wheels, means for operating the arm, together with means coöperating with the other ratchet wheel and clutch mechanism whereby the feed may be stopped through said mechanism.

18. In a window shade machine, the combination with means for supporting shade material, of means for forming a shade slat loop, feeding means for the material, two clutch mechanisms, a ratchet wheel coöperating with each clutch mechanism, a shaft, a dog carried by the shaft, an arm for moving the dog out of engagement with one of the ratchet wheels, a rod connected to the arm, and means for manually operating the rod whereby the dog may be thrown into or out of engagement to cause the feed to operate or to be stopped.

19. In a window shade machine, the combination with means for supporting shade material, of means for forming a shade slat loop, feeding means for the material, a clutch mechanism, a pulley coöperating with the clutch mechanism, a ratchet wheel coöperating with the clutch mechanism, a shaft, a dog carried by the shaft, an arm for moving the dog out of engagement with the ratchet wheel, a rod connected to the arm, and means for manually operating the rod whereby the dog may be thrown into or out of engagement to cause the feed to operate or to be stopped.

20. In a window shade machine, the combination with means for feeding shade material, of means for forming a shade slat loop, two clutch mechanisms operatively connected with the feed and adapted to control the same, means whereby the feed may be stopped independently of the movement of the other part of the machine, together with emergency means for stopping the machine at any desired point.

21. In a window shade machine, the combination of means for supporting shade material, feeding means, two clutch mechanisms coöperating with the feeding means, and means for independently controlling said clutch mechanisms.

22. In a window shade machine, the combination with means for supporting shade material, of feeding means therefor, means for forming a shade slat loop, means for cutting the material transversely, a shaft, two clutch mechanisms mounted upon the shaft and connected to operate the feed, a ratchet wheel coöperating with one of the clutch mechanisms, a dog adapted to engage the teeth of said ratchet wheel, means for operating the dog, an independently movable dog, means for actuating said latter dog, and means carried by part of the clutch mechanism whereby the said clutch mechanism may be permitted to rotate and operate the feed or the feed stopped by the engagement of said dog.

23. In a window shade machine, the combination with means for supporting shade material, of feeding means therefor, a shaft, two clutch mechanisms mounted upon the shaft and connected to operate the feed, a ratchet wheel coöperating with one of the clutch mechanisms, a dog adapted to engage the teeth of said ratchet wheel, means for operating the dog, an independently movable dog, means for actuating said latter dog, and means carried by part of the clutch mechanism whereby the said clutch mechanism may be permitted to rotate and operate the feed or the feed stopped by the engagement of either of said dogs.

24. In a window shade machine, the combination with means for supporting shade material, of feeding means therefor, means for forming a shade slat loop, means for cutting the material transversely, a shaft, two clutch mechanisms mounted upon the shaft and connected to operate the feed, a ratchet wheel coöperating with one of the clutch mechanisms, a dog adapted to engage the teeth of said ratchet wheel, and means for operating the dog to stop the machine by the engagement of said dog.

25. In a window shade machine, the combination with means for supporting shade material, of feed mechanism for the shade material, a clutch mechanism operatively connected to the feed mechanism, means operatively connected to the clutch adapted to start and stop the machine, a cam, and means coöperating with the cam to stop the feed independent of said clutch mechanism.

26. In a window shade machine, the combination with means for supporting shade material, of feed mechanism for the shade material, a mechanism operatively connected to the feed mechanism, means operatively connected to the mechanism connected to the feed adapted to start and stop the machine, a cam, and means coöperating with the cam to stop the feed independent of said latter mechanism.

27. In a window shade machine, the combination with means for supporting shade material, of feeding means for the shade material, a clutch mechanism operatively connected to the feed mechanism, means operatively connected to the clutch adapted to start and stop the machine, and means for stopping the feed independent of said clutch mechanism.

28. In a window shade machine, the combination with means for supporting shade material, of feeding means, two mechanisms for operating the feed mechanism at different periods, and means for independently throwing in or out of operation each of said mechanisms.

29. In a window shade machine, the combination with means for supporting shade material, of means for forming a shade slat loop, feed rolls for the material, a clutch mechanism, a ratchet wheel coöperating with the clutch mechanism, a shaft, a dog carried by the shaft adapted to engage the teeth of the ratchet wheel, an arm held to the shaft, a second arm held to the shaft, a pawl carried by said second arm, an arm loosely mounted on the shaft, a dog movable with said arm and adapted to engage a part of the clutch mechanism, means carried by the said latter arm adapted to be engaged by the pawl to throw the last-mentioned dog out of engagement with the clutch mechanism, a cam adapted to engage the arm carrying the dog and adapted to hold the dog disengaged during the greater part of the revolution of said cam, and manual means for operating the first-mentioned arm to disengage the dog from the ratchet wheel to permit the machine to operate or to be stopped.

30. In a window shade machine, the combination with means for supporting shade material, of means for forming a shade slat loop, feeding means for the material, a clutch mechanism operatively connected to the feeding means, a ratchet wheel coöperating with the clutch mechanism, a shaft, a dog carried by the shaft adapted to engage the teeth of the ratchet wheel, an arm held to the shaft, a second arm held to the shaft, a pawl carried by said second arm, an arm loosely mounted on the shaft, a dog movable with said arm and adapted to engage a part of the clutch mechanism, and means for operating the dogs.

31. In a window shade machine, the combination with means for supporting shade material, of feeding means for the material, a clutch mechanism, a ratchet wheel coöperating with the clutch mechanism, a shaft, a dog carried by the shaft adapted to engage the teeth of the ratchet wheel, an arm held to the shaft, a second arm held to the shaft, a pawl carried by said second arm, an arm loosely mounted on the shaft, a dog movable with said arm and adapted to engage a part of the clutch mechanism, means carried by the said latter arm adapted to be engaged by the pawl to throw the last-mentioned dog out of engagement with the clutch mechanism, and a cam adapted to engage the arm carrying the dog and adapted to hold the dog disengaged during the greater part of the revolution of said cam.

32. In a window shade machine, the combination with means for supporting shade material, of feeding means for the material, a clutch mechanism, a ratchet wheel coöperating with the clutch mechanism, a shaft, a dog carried by the shaft adapted to engage the teeth of the ratchet wheel, an arm held to the shaft, a second arm held to the shaft, a pawl carried by said second arm, an arm loosely mounted on the shaft, a dog movable with said arm and adapted to engage a part of the clutch mechanism, means carried by the said latter arm adapted to be engaged by the pawl to throw the last-mentioned dog out of engagement with the clutch mechanism, a cam adapted to engage the arm carrying the dog and adapted to hold the dog disengaged during the greater part of the revolution of said cam, manual means for operating the first-mentioned arm to disengage the dog from the ratchet wheel to permit the machine to operate or to be stopped, and means whereby the machine may be set for different lengths of shades.

33. In a window shade machine, the combination with means for supporting shade material, of feeding means, mechanism coöperating with the feeding means to start or stop the same, a dog adapted to engage part of said last-mentioned mechanism, an arm movable with said dog, a cam for moving the arm and holding the dog disengaged for the greater part of the movement of said cam, and means for operating said dog independent of the cam to start and stop the feed.

34. In a window shade machine, the combination with means for supporting shade material, of feeding means, mechanism cooperating with the feeding means to start or stop the same, a dog adapted to engage a part of said last-mentioned mechanism, an arm movable with said dog, and a cam for moving the arm and holding the dog disengaged for the greater part of the movement of said cam.

35. In a window shade machine, the combination with means for supporting shade material, of feeding means, two mechanisms arranged to independently operate the feed, a ratchet wheel coöperating with one of the said mechanisms, a shaft, an arm carrying a dog held to said shaft and adapted to engage the ratchet wheel, an arm secured to the shaft, a manually movable rod connected to said latter arm, a cylinder, two collars fixed upon the rod, one arranged within the cylinder and one on the outside thereof, a loose collar arranged around the rod within the cylinder, a spring arranged in the cylinder between the fast and the loose collar, a manually operable lever connected to the rod, and means for holding the lever against movement.

36. In a window shade machine, the combination with means for supporting shade material, of feeding means, two mechanisms arranged to independently operate the feed, a shaft, an arm secured to the shaft, a manually movable rod connected to said latter arm, a cylinder, two collars fixed upon the rod, one arranged within the cylinder and one on the outside thereof, a loose collar arranged around the rod within the cylinder, a spring arranged in the cylinder between the fast and the loose collar, a manually operable lever connected to the rod, and means for holding the lever against movement.

37. In a window shade machine, the combination with means for supporting shade material, of feeding means, a mechanism arranged to operate the feed, an arm operatively connected to start or stop said mechanism, a manually movable rod connected to said latter arm, a cylinder, two collars fixed upon the rod, means for operating said rod, and a spring tending normally to keep the rod in an intermediate position between its inward and outward movement.

38. In a window shade machine, the combination with means for supporting shade material, of means for feeding said material, a mechanism operatively connected to the feed mechanism to operate the same and including an independently movable element, a dog adapted to hold said element against movement, an arm movable with said dog and having a trundle at one end, a cam having means to permit independent movement of said arm and adapted to hold the arm in a position to cause the dog to be disengaged from the element of said feed operating mechanism the greater part of its movement, a spring normally forcing the arm in one direction, and means for disengaging the dog and for moving the arm independent of the movement of the cam.

39. In a window shade machine, the combination with means for supporting shade material, of means for feeding said material, a mechanism operatively connected to the feed mechanism to operate the same and including an independently movable element, a dog adapted to hold said element against movement, an arm movable with said dog and having a trundle at one end, a cam having means to permit independent movement of said arm and adapted to hold the arm in a position to cause the dog to be disengaged from the element of said feed operating mechanism the greater part of its movement, and means for disengaging the dog and for moving the arm independent of the movement of the cam.

40. In a window shade machine, the combination with means for supporting shade material, of means for feeding said material, a mechanism operatively connected to the feed mechanism to operate the same and including an independently movable element, a dog adapted to hold said element against movement, an arm movable with said dog, and a cam having means to permit independent movement of said arm and adapted to hold the arm in a position to cause the dog to be disengaged from the element of said feed operating mechanism the greater part of its movement, said cam having a cam part to force the dog into engagement with the element of said mechanism.

41. In a window shade machine, the combination with means for supporting shade material, of feeding means for the material, a clutch mechanism including an independently movable element, a dog adapted to hold the said element against movement or permit the same to move to operate the feed, an arm movable with said dog, a shaft on which said dog and arm are loosely mounted, a spring normally forcing the arm in one direction, a second arm held to the shaft, a pawl carried by said latter arm, an extended part carried by the first-mentioned arm and having a tooth adapted to be engaged by the pawl, a bell-crank lever held to move with the pawl and serving to disengage the same from said tooth, a spring normally forcing the bell-crank lever in one direction, and means adapted to engage said bell-crank lever to disengage the pawl to permit the first-mentioned spring to suddenly force the first-mentioned arm and dog movable therewith into engagement with the independent element of the clutch mechanism to stop the same, and a cam serving to hold the arm and dog disengaged from the clutch mechanism for the greater part of its movement.

42. In a window shade machine, the combination with means for supporting shade material, of feeding means for the material, a clutch mechanism including an independently movable element, a dog adapted to hold the said element against movement or permit the same to move to operate the feed, an arm movable with said dog, a shaft on which said dog and arm are loosely mounted, a spring normally forcing the arm in one direction, a second arm held to the shaft, a pawl carried by said latter arm, an extended part carried by the first-mentioned arm and having a tooth adapted to be engaged by the pawl, means for disengaging the pawl to permit the first-mentioned arm and dog movable therewith to engage the independent element of the clutch mechanism to stop the same, and a cam serving to hold the arm and dog disengaged from the clutch mechanism for the greater part of its movement.

43. In a window shade machine, the combination with means for supporting shade material, of feeding means for the material, a clutch mechanism including an independently movable element, a dog adapted to hold the said element against movement or permit the same to move to operate the feed, an arm movable with said dog, a shaft on which said dog and arm are loosely mounted, a spring normally forcing the arm in one direction, a second arm held to the shaft, a pawl carried by said latter arm, an extended part carried by the first-mentioned arm and having a tooth adapted to be engaged by the pawl, and means for disengaging the pawl to permit the first-mentioned arm and dog movable therewith to engage the independent element of the clutch mechanism to stop the same.

44. In a window shade machine, the combination with means for supporting shade material, of feeding means for the material, a mechanism including an independently movable element, a dog adapted to hold the said element against movement or permit the same to move to operate the feed, an arm movable with said dog, a shaft on which said dog and arm are loosely mounted, means for operating said arm, and a cam serving to hold the arm and dog disengaged from the clutch mechanism for the greater part of its movement.

45. In a window shade machine, the combination with means for supporting shade material, of means for feeding the shade material, two independent clutch mechanisms operatively connected to the feed and adapted to stop and start the feed, a rotary cam, means coöperating with the cam adapted to permit the machine to be started or to be stopped, a ratchet wheel coöperating with one of the clutch mechanisms, an arm carrying a dog adapted to engage the teeth of said ratchet wheel, and means carried by the cam whereby the dog may be disengaged from the ratchet wheel at the same time that the other clutch mechanism is operated to stop the feed.

46. In a window shade machine, the combination with means for supporting shade material, of means for feeding the shade material, two independent mechanisms operatively connected to the feed and adapted to stop and start the feed, a cam, means coöperating with the cam adapted to permit the machine to be started or to be stopped, a ratchet wheel coöperating with one of the mechanisms, an arm carrying a dog adapted to engage the teeth of said ratchet wheel, and means carried by the cam whereby the dog may be disengaged from the ratchet wheel at the same time that the other mechanism is operated to stop the feed.

47. In a window shade machine, the combination with means for supporting shade material, of means for feeding the shade material, two mechanisms operatively connected to the feed and adapted to stop and start the feed, a rotary cam, means coöperating with the cam adapted to permit the machine to be started or to be stopped, a ratchet wheel coöperating with one of the mechanisms, an arm carrying a dog adapted to engage the teeth of said ratchet wheel, and means carried by the cam whereby the dog may be disengaged from the ratchet wheel.

48. In a window shade machine, the combination with means for supporting shade material, of feeding means, a clutch mechanism operatively connected to said feeding means, a rotary element, a cam independently movable of said element, a ratchet wheel relatively movable with respect to said cam, means carried by the rotary element adapted to engage the ratchet wheel, and means coöperating with the ratchet wheel whereby the feed may be stopped.

49. In a window shade machine, the combination with means for supporting shade material, of feeding means, mechanism operatively connected to said feeding means, a rotary element, an element independently movable of said rotary element, a toothed wheel relatively movable with respect to said rotary element, means carried by the rotary element adapted to engage the toothed wheel, and means coöperating with said toothed wheel whereby the feed may be stopped.

50. In a window shade machine, the combination with means for supporting shade material, of feeding means, mechanism for operating the feed, a movable element, a toothed wheel, an arm having a part adapted to engage the teeth of said wheel to move the same, manually operated means for shifting the relative positions of the element and wheel to determine the length of the shade to be made, and means coöperating with the wheel to stop the feed.

51. In a window shade machine, the combination with means for supporting shade material, of feeding means, mechanism for operating the feed, two relatively movable elements, and means coöperating with said elements for determining the extent of movement of said mechanism and thereby the feed.

52. In a window shade machine, the combination with means for supporting shade material, of feeding means, mechanism for operating the feed, a movable element, a ratchet wheel, an arm having a part adapted to engage the ratchet wheel to move the same, means for shifting the relative positions of the element and ratchet wheel to determine the length of the shade to be made, and means coöperating with the ratchet wheel to stop the feed.

53. In a window shade machine, the combination with means for supporting shade material, of feeding means for the material, mechanism for operating the feed at two distinct periods, a rotary element having a notched portion, a ratchet wheel relatively movable with respect to the rotary element, an arm having a tooth adapted to engage the teeth of the ratchet wheel, means tending normally to force the tooth into engagement with the ratchet wheel, the said rotary element tending normally to hold the tooth out of engagement with the ratchet wheel except at the point where it is notched, means for shifting the relative position of the notch of the rotary element with the tooth and thereby determine the length of shade to be made, and means coöperating with the ratchet wheel for stopping the feed.

54. In a window shade machine, the combination with means for supporting shade material, of feeding means for the material, mechanism for operating the feed, a rotary element having a notched portion, a ratchet wheel relatively movable with respect to the rotary element, an arm having a tooth adapted to engage the teeth of the ratchet wheel, means tending normally to force the tooth into engagement with the ratchet wheel, the said rotary element tending normally to hold the tooth out of engagement with the ratchet wheel except at the point where it is notched, means for shifting the relative position of the notch of the rotary element with the tooth and thereby determine the length of shade to be made, and means coöperating with the ratchet wheel for stopping the feed.

55. In a window shade machine, the combination with means for supporting shade material, of feeding means for the material, mechanism for operating the feed, a rotary disk-like element, a ratchet wheel relatively movable with respect to the rotary element, an arm having a tooth adapted to engage the teeth of the ratchet wheel, means tending normally to force the tooth into engagement with the ratchet wheel, the said rotary element tending normally to hold the tooth out of engagement with the ratchet wheel except at the point where it is notched, and means coöperating with the ratchet wheel for stopping the feed.

56. In a window shade machine, the combination with means for supporting shade material, of means for feeding the material, mechanism for operating the feed at two distinct periods, means for measuring the length of shade, a pointer operatively connected to move with the machine as the shade is made, together with a pointer operated by the measuring means to indicate the length of shade which is to be made.

57. In a window shade machine, the combination with means for supporting shade material, of means for feeding the material, mechanism for operating the feed, means for determining the length of the shade, a pointer operatively connected to move with the machine as the shade is made, together with a pointer operated by the measuring means to indicate the length of shade which is to be made.

58. In a window shade machine, the combination with means for supporting shade material, of means for feeding the material, mechanism for operating the feed, a pointer operatively connected to move with the machine as the shade is made, together with a pointer to indicate the length of shade which is to be made.

59. In a window shade machine, the combination with means for supporting shade material, of means for feeding the material, mechanism for operating the feed, measuring means for determining the length of shade to be made, and indicating means including two pointers one operated as the shade is made and making a complete rotation therewith, and the other pointer operatively connected to the measuring means to indicate the length of shade.

60. In a window shade machine, the combination with means for supporting shade material, of means for feeding the material, mechanism for operating the feed, measuring means for determining the length of shade to be made, and indicating means including two pointers one operated as the shade is made and the other pointer operatively connected to the measuring means to indicate the length of shade, and means to stop the machine and the pointer movable therewith.

61. In a window shade machine, the combination with means for supporting shade material, of means for feeding the material at two distinct periods, means whereby the machine may be set to make shades of different lengths, a shaft, a pointer secured to said shaft and movable with the machine, a dial about which the pointer moves, a second pointer, a tubular shaft to which said pointer is held, a worm gear secured to said tubular shaft, a worm in mesh with said worm gear, means connected with the measuring means whereby the pointer may be set to correspond with the setting of the measuring means, and means whereby the feed may be stopped.

62. In a window shade machine, the combination with means for supporting shade material, of means for feeding the material, means whereby the machine may be set to make shades of different lengths, a shaft, a pointer secured to said shaft and movable with the machine, a dial about which the pointer moves, a second pointer, and means connected with the measuring means whereby the second pointer may be set to correspond with the setting of the measuring means.

63. In a window shade machine, the combination with means for supporting shade material, of means for feeding the material at two distinct periods, means whereby the machine may be set to make shades of different lengths, a shaft, a pointer secured to said shaft and movable with the machine, a dial about which the pointer moves, a second pointer, means connected with the measuring means whereby the second pointer may be set to correspond with the setting of the measuring means, and means whereby the feed may be stopped.

64. In a window shade machine, the combination with means for supporting shade material, of means for feeding the material, means whereby the machine may be set to make shades of different lengths, a pointer movable with the machine, a dial about which the pointer moves, a second pointer also movable about the dial and means connected with the measuring means whereby the second pointer may be set to correspond with the setting of the measuring means, and means whereby the feed may be stopped.

65. In a window shade machine, the combination with means for supporting shade material, of means for forming a shade slat loop, cutting means for cutting the material transversely, a feed roll, means for rotating said feed roll, a second feed or pressure roll, and means throwing the pressure roll into or out of engagement with the feed roll.

66. In a window shade machine, the combination with means for supporting shade material, of means for forming a shade slat loop, a feed roll, means for rotating said feed roll, a second feed or pressure roll, and means throwing the pressure roll into or out of engagement with the feed roll and for locking the same in an engaging position 67. In a window shade machine, the combination with means for supporting shade material, of means for forming a shade slat loop, a large feed roll, means for rotating said roll, a smaller pressure roll, pivotally held brackets in which the said pressure roll is journaled, and means for locking the brackets in a position to cause the pressure roll to engage the larger roll and for moving the pressure roll and brackets to a position to remove the pressure roll to permit the shade material to be readily threaded in the machine.

68. In a window shade machine, the combination with means for supporting shade material, of means for forming a shade slat loop, a feed roll, means for rotating said roll, a pressure roll, pivotally held brackets in which the said pressure roll is journaled, and means for moving the pressure roll and brackets to a position to remove the pressure roll to permit the shade material to be readily threaded in the machine.

69. In a window shade machine, the combination with means for supporting shade material, of means for forming a shade slat loop, a feed roll, means for rotating said roll, a pressure roll, brackets in which the said pressure roll is journaled, and means for locking the brackets in a position to cause the pressure roll to engage the feed roll and for moving the pressure roll and brackets to a position to remove the pressure roll to permit the shade material to be readily threaded in the machine.

70. In a window shade machine, the combination with means for supporting shade material, of a large feed roll, means for rotating said feed roll, a plurality of brackets, a pressure roll, boxes in which the pressure roll is journaled and slidably held in said brackets, springs normally forcing the boxes in one direction, and manually operated means for removing the pressure roll out of engagement with the large feed roll.

71. In a window shade machine, the combination with means for supporting shade material, of means for forming a shade slat loop, a feed roll, brackets pivotally held to the machine frame, a pressure roll held in said brackets, a catch arranged on each side of the machine, a pin for each catch, said catches being movable with the brackets, an eccentric for disengaging each catch from its engaging pin, a spring normally forcing the catch to engaging position, and a substantially U-shaped arm having means for rotating the eccentrics to release the catches and for throwing the brackets on their pivots to remove the pressure-roll from engagement with the feed roll.

72. In a window shade machine, the combination with means for supporting shade material, of means for forming a shade slat loop, a feed roll, brackets pivotally held to the machine frame, a pressure roll held in said brackets, a substantially U-shaped arm having means for throwing the brackets on their pivots to remove the pressure roll from engagement with the feed roll.

73. In a window shade machine, the combination with means for supporting shade material, of means for forming a shade slat loop, a feed roll, brackets pivotally held to the machine frame, a pressure roll held in said brackets, a catch adapted to engage a part of the machine, said catch being movable with the brackets, an eccentric for disengaging the catch, and an arm having means for rotating the eccentrics to release the catch and for throwing the brackets on their pivots to remove the pressure roll from engagement with the feed roll.

74. In a window shade machine, the combination with means for supporting shade material, of a feed roll, brackets pivotally held to the machine frame, a pressure roll held in said brackets, means for locking the brackets in position to hold the pressure roll against the feed roll, and a substantially U-shaped arm having means for releasing the brackets and for throwing said brackets on their pivots to remove the pressure roll from engagement with the feed roll.

75. In a window shade machine, the combination with means for supporting shade fabric, of feeding means, cutters for trimming the fabric lengthwise thereof at each edge, manually operated means for adjusting one set of cutters transversely of the machine, and a friction device tending to hold the manually operated means against movement.

76. In a window shade machine, the combination with means for supporting shade fabric, of feeding means, cutters for trimming the fabric lengthwise thereof at each edge, manually operated means for adjusting one set of cutters transversely of the machine, and means for holding the manually operated means against movement.

77. In a window shade machine, the combination with means for supporting shade material, of means for forming a shade slat loop, a set of cutters located at each side of the machine for trimming the material lengthwise thereof, manually operated means for adjusting one set of cutters including a shaft, a member having a friction surface slidingly held to said shaft, a nut adjustable on said shaft, and a spring interposed between the nut and said member.

78. In a window shade machine, the combination with means for supporting shade material, of means for forming a shade slat loop, a set of cutters located at each side of the machine for trimming the material lengthwise thereof, manually operated means for adjusting one set of cutters including a shaft, a member having a friction disk and slidingly held on said shaft, a nut adjustable on said shaft, and a spring interposed between the nut and the member.

79. In a window shade machine, the combination with means for supporting and feeding shade material, of shade slat loop forming mechanism comprising crimping means, a cross-head having two independently movable blades, a supplemental gripping device mounted on the cross-head and yieldingly held thereto, means for moving the cross-head a certain distance, a treadle, and rods connected to the treadle and to the other blade for imparting a further movement thereto.

80. In a window shade machine, the combination with means for supporting and feeding shade material, of shade slat loop forming mechanism comprising crimping means, a cross-head having two independently movable blades, a supplemental gripping device mounted on the cross-head and yieldingly held thereto, means for moving the cross-head a certain distance, a treadle, rods connected to the treadle and to the other blade for imparting a further movement thereto, and counterbalancing means for said cross-head and blades.

81. In a window shade machine, the combination with means for supporting a shade fabric, of feeding means, means for forming a shade slat loop including a movable cross-head, arms operatively connected to the cross-head, and rotary devices having projecting parts of relatively different lengths adapted to form stops and regulate the movement of the cross-head and thereby the size of the shade slat loop.

82. In a window shade machine, the combination with means for supporting a shade fabric, of feeding means, means for forming a shade slat loop including a movable cross-head, and a rotary device having projecting parts of relatively different lengths adapted to form stops and regulate the movement of the cross-head and thereby the size of the shade slat loop.

83. In a window shade machine, the combination with means for supporting a shade fabric, feeding means, means for forming a shade slat loop including a movable cross-head, and a rotary device having four projecting parts of relatively different lengths adapted to form stops and regulate the movement of the cross-head and thereby the size of the shade slat loop.

84. In a window shade machine, the combination with means for supporting shade material, of means for forming a shade slat loop, feeding means, shade roller supporting means, and means whereby the shade roller supporting means may be independently adjusted or both simultaneously adjusted.

85. In a window shade machine, the combination with means for supporting a shade material, of means for forming a shade slat loop, feeding means, shade roller supporting means, a bar to which the supporting means is held, and means whereby the shade roller supporting means may be independently adjusted or both simultaneously adjusted by movement of said bar.

86. In a window shade machine, the combination with means for supporting shade material, of means for forming a shade slat loop, cutting means, brackets, chucks held in said brackets, cam gripping devices arranged in the brackets and adapted to independently adjust the chucks, a bar, and means whereby the bar may be moved to adjust both brackets and chucks simultaneously.

87. In a window shade machine, the combination with means for supporting shade material, of means for forming a shade slat loop, cutting means, brackets, chucks held in said brackets, means arranged in the brackets and adapted to independently adjust the chucks, a bar, and means for moving the bar bodily to adjust both brackets and chucks simultaneously.

88. In a window shade machine, the combination with means for supporting shade material, of means for forming a shade slat loop, shade roller supporting chucks, cam gripping devices adapted to independently adjust the chucks, a bar, and means whereby the bar may be moved to adjust both chucks simultaneously.

89. In a window shade machine, the combination with means for supporting shade material, of feeding means, a transversely movable knife, means for forming a shade slat loop including a movable cross-head, means for forcing the knife transversely of the machine, and means automatically actuated during the movement of the cross-head whereby the knife may be automatically forced across the machine.

90. In a window shade machine, the combination with means for supporting shade material, of feeding means, a transversely movable knife, means for forming a shade slat loop including a movable cross-head, means for forcing the knife transversely of the machine, friction means for forcing the knife in the opposite direction, and means automatically actuated during the movement of the cross-head whereby the friction means may be released and the knife automatically forced across the machine.

91. In a window shade machine, the combination with means for supporting shade material, of means for feeding the material, shade slat loop forming mechanism, a roll, a friction roll engaging said latter roll and having a drum as a part thereof, a knife connected to the drum, an arm carrying said roll, means whereby the drum may cause the knife to move in one direction transversely of the machine, means tending normally to force the knife in the opposite direction across the machine, a two-part arm having a cam portion and connected to the friction roll, and levers operatively connected to a part of the loop forming mechanism and adapted to engage the arm to release the friction roll to permit the knife to be forced transversely of the machine and to be again engaged to force the knife automatically across the machine in the opposite direction.

92. In a window shade machine, the combination with means for supporting shade material, of means for feeding the material, a roll, a friction roll engaging said latter roll and having a drum as a part thereof, a knife connected to the drum, an arm carrying said roll, means whereby the drum may cause the knife to move in one direction transversely of the machine, means tending normally to force the knife in the opposite direction across the machine, an arm having a cam portion and connected to the friction roll, and means adapted to engage the arm to release the friction roll to permit the knife to be forced transversely of the machine and to be again engaged to force the knife automatically across the machine in the opposite direction.

93. In a window shade machine, the combination with means for supporting shade material, of means for feeding the material, shade slat loop forming mechanism, a roll, a friction roll engaging said latter roll and having a drum as a part thereof, a knife connected to the drum, an arm carrying said roll, means whereby the drum may cause the knife to move in one direction transversely of the machine, means tending normally to force the knife in the opposite direction across the machine, an adjustable arm having a cam portion and connected to the friction roll, and levers operatively connected to a part of the loop forming mechanism and adapted to operate the arm to release the friction roll to permit the knife to be forced transversely of the machine and to be again engaged to force the knife automatically across the machine in the opposite direction.

94. In a window shade machine, the combination with means for supporting shade material, of means for feeding the material including a feed roll, a shaft for said roll, a clutch having two members arranged on said shaft, one of which members is adapted to move independent of said shaft, mechanism connected to said member to rotate the same, a hand wheel having a hub portion keyed to slide on said shaft and formed as a part of said clutch, and a spring tending normally to force the members of the clutch into engagement to permit the mechanism to operate the feed roll or to permit the hand wheel to operate the feed roll by disengaging the clutch members and independently of said mechanism.

95. In a window shade machine, the combination with means for supporting shade material, of means for feeding the material including a feed roll, a shaft for said roll, a clutch having two members arranged on said shaft, mechanism connected to one of said members to rotate the same, a hand wheel connected to the other clutch member to rotate the same, and a spring tending normally to force the members of the clutch into engagement to permit the mechanism to operate the feed roll or to permit the hand wheel to operate the feed roll by disengaging the clutch members and independently of said mechanism.

96. In a window shade machine, the combination of means for supporting shade material, means for forming a shade slat loop, feeding means including a roll, mechanism whereby the feed roll may be automatically actuated, a clutch mechanism connected with the feeding means, a hand wheel, a second clutch mechanism, and a spring arranged to force the hand wheel in one direction to cause one clutch to be normally held in a disengaged position and the other in an operative position and which permits the disengagement of one clutch and the engagement of the other to disconnect the roll from its operating mechanism and to permit the same to be operated by the hand wheel.

97. In a window shade machine, the combination of means for supporting shade material, means for forming a shade slat loop, feeding means including a roll, mechanism whereby the feed roll may be automatically actuated, a clutch mechanism connected with the feed, a hand wheel, a second clutch mechanism and means arranged to force the hand wheel in one direction to cause one clutch to be normally held in a disengaged position and the other in an operative position and which permits the disengagement of one clutch and the engagement of the other to disconnect the roll from its operating mechanism and to permit the same to be operated by the hand wheel.

This specification signed and witnessed this 17th day of July A. D. 1911.

BENJAMIN W. TUCKER.

Witnesses:
CECELIA A. HURLEY,
GEORGE V. JAMES.